US012698897B2

(12) United States Patent
Wright, Jr. et al.

(10) Patent No.: US 12,698,897 B2
(45) Date of Patent: Aug. 4, 2026

(54) ADDITIVELY MANUFACTURED COMBUSTION CHAMBERS, MANIFOLD STRUCTURES AND HYBRID ADDITIVE PROCESSES RELATED THERETO

(71) Applicant: Relativity Space, Inc., Long Beach, CA (US)

(72) Inventors: Van Earl Bishop Wright, Jr., Long Beach, CA (US); Erik Daniel Stengline, Long Beach, CA (US); Thomas Vaughn, Long Beach, CA (US); Fritz C. Gruber, Long Beach, CA (US); Vladislav Mogilevskiy, Long Beach, CA (US); Nazareth Ekmekjian, Long Beach, CA (US); Rocco DiVerdi, Long Beach, CA (US); Alyssa Ishigo, Long Beach, CA (US); Benjamin Stephen Waxman, Long Beach, CA (US); Jacob Shearman, Long Beach, CA (US); Allan Huang, Long Beach, CA (US); Samuel James Tonneslan, Long Beach, CA (US); Aaron Goldfogel, Long Beach, CA (US); John Charles Fuller, Long Beach, CA (US); Andrew Neil Osborn, Long Beach, CA (US); Chandler Aulick, Long Beach, CA (US); Alexander Weisfeld, Long Beach, CA (US)

(73) Assignee: Relativity Space, Inc., Long Beach, CA (US)

( * ) Notice: Subject to any disclaimer, the term of this patent is extended or adjusted under 35 U.S.C. 154(b) by 0 days.

(21) Appl. No.: 18/515,033

(22) Filed: Nov. 20, 2023

(65) Prior Publication Data

US 2024/0219027 A1      Jul. 4, 2024

Related U.S. Application Data

(60) Provisional application No. 63/386,841, filed on Dec. 9, 2022.

(51) Int. Cl.
| | |
|---|---|
| *F23R 3/00* | (2006.01) |
| *B33Y 10/00* | (2015.01) |
| (Continued) | |

(52) U.S. Cl.
CPC ............. *F23R 3/002* (2013.01); *B33Y 10/00* (2014.12); *B33Y 80/00* (2014.12); *B33Y 70/00* (2014.12);
(Continued)

(58) Field of Classification Search
CPC ........... F02K 9/972; B22F 10/28; B33Y 10/00
See application file for complete search history.

(56) References Cited

U.S. PATENT DOCUMENTS

| 3,177,656 A | * | 4/1965 | Tick | .......................... F02K 9/64 |
| | | | | 60/260 |
| 3,331,545 A | | 7/1967 | Olivieri | |
| | | | (Continued) | |

FOREIGN PATENT DOCUMENTS

| CN | 101733521 A | 6/2010 |
| CN | 104001918 A | 8/2014 |
| | (Continued) | |

OTHER PUBLICATIONS

Extended European Search Report for European Application No. 23215073.0, Search completed Apr. 26, 2024, Mailed May 8, 2024, 14 Pgs.
(Continued)

*Primary Examiner* — Michael W Hotchkiss
(74) *Attorney, Agent, or Firm* — KPPB LLP

(57) ABSTRACT

Additively manufactured thrust chambers and thrust chambers with integral fluid manifolds, and hybrid additive
(Continued)

manufacturing methods for their production, are provided. Hybrid additive manufacturing techniques may combine a variety of processes including, WAAM, PBF, cold spray and DED, for example, to produce objects with variant dimensional requirements, i.e., large overall size and small features. Hybrid additive manufacturing may be defined as provide various process layers within any manufactured object. These process layers in turn allow for the introduction of variable feature and size distribution throughout the manufactured object. Hybrid process layers according to aspects may also allow the use of a variety of materials or may use a single material across the various process layers.

11 Claims, 31 Drawing Sheets

(51) Int. Cl.
  *B33Y 70/00* (2020.01)
  *B33Y 80/00* (2015.01)
(52) U.S. Cl.
  CPC .............. *F23R 2900/00018* (2013.01); *F23R 2900/03043* (2013.01)

(56) References Cited

U.S. PATENT DOCUMENTS

| | | | |
|---|---|---|---|
| 3,344,305 A | | 9/1967 | Ogden et al. |
| 3,447,730 A | | 6/1969 | Jeannette |
| 3,555,235 A | | 1/1971 | Darrow et al. |
| 3,562,577 A | | 2/1971 | Kensrue |
| 3,934,482 A | | 1/1976 | Byers |
| 4,043,494 A | | 8/1977 | Bickford et al. |
| 4,047,656 A | | 9/1977 | Mccombs |
| 4,228,338 A | | 10/1980 | Cook et al. |
| 4,333,594 A | | 6/1982 | Cloos |
| 4,582,678 A | | 4/1986 | Niino et al. |
| 4,866,237 A | | 9/1989 | Inoue |
| 5,137,223 A | | 8/1992 | Brandon et al. |
| 5,249,357 A | * | 10/1993 | Holmes ..................... F02K 9/64 |
| | | | 427/236 |
| 6,004,124 A | | 12/1999 | Swanson et al. |
| 6,335,511 B1 | | 1/2002 | Rothermel |
| 6,391,251 B1 | | 5/2002 | Keicher et al. |
| 6,443,352 B1 | | 9/2002 | White |
| 6,557,742 B1 | | 5/2003 | Bobeczko et al. |
| 6,568,578 B1 | | 5/2003 | Kensrue |
| 6,776,602 B2 | | 8/2004 | Swanson et al. |
| 6,945,032 B2 | * | 9/2005 | Lundgren .............. B23K 26/24 |
| | | | 60/260 |
| 7,062,849 B2 | | 6/2006 | Ohashi et al. |
| 7,073,561 B1 | | 7/2006 | Henn |
| 7,168,935 B1 | | 1/2007 | Taminger et al. |
| 7,169,337 B2 | | 1/2007 | Swanson et al. |
| 7,235,149 B2 | | 6/2007 | Taggart |
| 7,299,622 B2 | * | 11/2007 | Haggander .............. F02K 9/972 |
| | | | 60/257 |
| 7,335,854 B2 | | 2/2008 | Hutchison |
| 7,384,255 B2 | | 6/2008 | Labossiere et al. |
| 7,700,893 B2 | | 4/2010 | Kaufman |
| 7,754,597 B2 | | 7/2010 | Toyoda |
| 7,896,209 B2 | | 3/2011 | Batchelder et al. |
| 7,897,074 B2 | | 3/2011 | Batchelder et al. |
| 8,308,876 B2 | | 11/2012 | Woods et al. |
| 8,487,184 B2 | | 7/2013 | Rivernider et al. |
| 8,534,108 B2 | | 9/2013 | Austen |
| 8,647,102 B2 | | 2/2014 | Swanson et al. |
| 8,878,097 B2 | | 11/2014 | Enyedy et al. |
| 9,073,263 B2 | | 7/2015 | Mannella et al. |
| 9,102,099 B1 | | 8/2015 | Karpas et al. |
| 9,144,862 B2 | | 9/2015 | Hemmert et al. |
| 9,156,205 B2 | | 10/2015 | Mark et al. |
| 9,168,698 B2 | | 10/2015 | Kemperle et al. |
| 9,254,535 B2 | | 2/2016 | Buller et al. |
| 9,327,452 B2 | | 5/2016 | Mark et al. |
| 9,346,116 B2 | | 5/2016 | Guldberg |
| 9,399,264 B2 | | 7/2016 | Stecker |
| 9,440,397 B1 | | 9/2016 | Fly |
| 9,457,514 B2 | | 10/2016 | Schwärzler |
| 9,481,931 B2 | | 11/2016 | Stempfer |
| 9,616,494 B2 | | 4/2017 | Vader et al. |
| 9,724,877 B2 | | 8/2017 | Flitsch et al. |
| 9,764,517 B2 | | 9/2017 | Potter |
| 9,784,111 B2 | | 10/2017 | Luo et al. |
| 9,789,652 B2 | | 10/2017 | Armstrong |
| 9,833,839 B2 | | 12/2017 | Gibson et al. |
| 9,835,114 B1 | | 12/2017 | Gradl et al. |
| 9,937,580 B2 | | 4/2018 | Peters et al. |
| 9,950,476 B2 | | 4/2018 | Nguyen et al. |
| 9,956,640 B2 | | 5/2018 | Burke et al. |
| 10,005,217 B2 | | 6/2018 | Willams et al. |
| 10,029,406 B2 | | 7/2018 | Burke et al. |
| 10,086,467 B2 | | 10/2018 | Burke et al. |
| 10,201,854 B2 | | 2/2019 | Sachs et al. |
| 10,232,443 B2 | | 3/2019 | Myerberg et al. |
| 10,272,492 B2 | | 4/2019 | Gibson et al. |
| 10,316,792 B2 | * | 6/2019 | Yousefiani ............ C23C 28/028 |
| 10,335,889 B2 | | 7/2019 | Burke et al. |
| 10,350,682 B2 | | 7/2019 | Myerberg et al. |
| 10,471,542 B1 | * | 11/2019 | Gradl ................. B23K 26/0884 |
| 10,527,003 B1 | | 1/2020 | Beck et al. |
| 10,565,333 B2 | | 2/2020 | Lacaze et al. |
| 10,639,717 B2 | | 5/2020 | Fontana et al. |
| 11,813,690 B2 | | 11/2023 | Burke et al. |
| 11,853,033 B1 | | 12/2023 | Mccallum et al. |
| 12,090,565 B2 | | 9/2024 | Burke et al. |
| 2004/0179217 A1 | | 9/2004 | Chapman et al. |
| 2005/0017411 A1 | | 1/2005 | Yang et al. |
| 2005/0224486 A1 | | 10/2005 | Matiash |
| 2006/0032212 A1 | * | 2/2006 | Wooten ..................... F02K 9/62 |
| | | | 60/257 |
| 2008/0073330 A1 | | 3/2008 | Diedrick et al. |
| 2008/0156783 A1 | | 7/2008 | Vanden et al. |
| 2010/0021638 A1 | | 1/2010 | Varanka et al. |
| 2010/0193480 A1 | | 8/2010 | Adams |
| 2011/0018976 A1 | | 1/2011 | Park |
| 2011/0150517 A1 | | 6/2011 | Chauvin et al. |
| 2011/0240607 A1 | | 10/2011 | Stecker et al. |
| 2011/0309063 A1 | | 12/2011 | Ott et al. |
| 2012/0160897 A1 | | 6/2012 | Enyedy |
| 2012/0247167 A1 | | 10/2012 | Austen |
| 2012/0325779 A1 | | 12/2012 | Yelistratov |
| 2014/0042129 A1 | | 2/2014 | Daniel |
| 2014/0061165 A1 | | 3/2014 | Stempfer |
| 2014/0117575 A1 | | 5/2014 | Kemperle et al. |
| 2014/0175076 A1 | | 6/2014 | Wang et al. |
| 2014/0242374 A1 | | 8/2014 | Strasser et al. |
| 2014/0251481 A1 | * | 9/2014 | Kroll ..................... B22F 10/385 |
| | | | 264/401 |
| 2014/0265037 A1 | | 9/2014 | Stirling et al. |
| 2014/0374048 A1 | | 12/2014 | Kennedy et al. |
| 2014/0374935 A1 | | 12/2014 | Flitsch et al. |
| 2015/0021379 A1 | | 1/2015 | Albrecht et al. |
| 2015/0027239 A1 | | 1/2015 | Konkle |
| 2015/0108095 A1 | | 4/2015 | Kruer et al. |
| 2015/0108695 A1 | | 4/2015 | Okada |
| 2015/0140147 A1 | | 5/2015 | Konstantinos et al. |
| 2015/0145169 A1 | | 5/2015 | Liu et al. |
| 2015/0209889 A1 | | 7/2015 | Peters et al. |
| 2015/0239178 A1 | | 8/2015 | Armstrong |
| 2015/0266244 A1 | | 9/2015 | Page |
| 2015/0298213 A1 | * | 10/2015 | Beyer ...................... F02K 9/97 |
| | | | 425/78 |
| 2015/0331402 A1 | | 11/2015 | Lin et al. |
| 2016/0010863 A1 | * | 1/2016 | Ott .......................... B22F 10/25 |
| | | | 428/141 |
| 2016/0031159 A1 | | 2/2016 | Church et al. |
| 2016/0039152 A1 | | 2/2016 | Hara |
| 2016/0052208 A1 | | 2/2016 | Debora et al. |
| 2016/0057250 A1 | | 2/2016 | Sakai et al. |
| 2016/0096318 A1 | | 4/2016 | Bickel et al. |

(56)         References Cited

U.S. PATENT DOCUMENTS

| | | | |
|---|---|---|---|
| 2016/0144575 A1* | 5/2016 | Rizzo, Jr. | G05B 19/4099 |
| | | | 425/135 |
| 2016/0167156 A1 | 6/2016 | Burke et al. | |
| 2016/0193703 A1 | 7/2016 | Kempers et al. | |
| 2016/0200052 A1 | 7/2016 | Moore et al. | |
| 2016/0263822 A1 | 9/2016 | Boyd | |
| 2016/0263839 A1 | 9/2016 | Miedema | |
| 2016/0297104 A1 | 10/2016 | Guillemette et al. | |
| 2016/0318130 A1 | 11/2016 | Stempfer et al. | |
| 2016/0339633 A1 | 11/2016 | Stolyarov et al. | |
| 2017/0036399 A1 | 2/2017 | Cheung | |
| 2017/0050254 A1 | 2/2017 | Holverson et al. | |
| 2017/0050383 A1 | 2/2017 | Bell et al. | |
| 2017/0056970 A1 | 3/2017 | Chin et al. | |
| 2017/0087632 A1 | 3/2017 | Mark | |
| 2017/0089782 A1 | 3/2017 | Hirt et al. | |
| 2017/0096967 A1* | 4/2017 | Bostwick | F02K 9/566 |
| 2017/0129170 A1 | 5/2017 | Kim et al. | |
| 2017/0136567 A1 | 5/2017 | Lahti et al. | |
| 2017/0136579 A1 | 5/2017 | Wagner et al. | |
| 2017/0136587 A1 | 5/2017 | Wagner et al. | |
| 2017/0138409 A1 | 5/2017 | Giese et al. | |
| 2017/0144373 A1 | 5/2017 | Erikson et al. | |
| 2017/0152142 A9 | 6/2017 | Kim et al. | |
| 2017/0157826 A1 | 6/2017 | Hishiki | |
| 2017/0165781 A1 | 6/2017 | Veldsman et al. | |
| 2017/0173692 A1 | 6/2017 | Myerberg et al. | |
| 2017/0173693 A1 | 6/2017 | Myerberg et al. | |
| 2017/0173697 A1 | 6/2017 | Myerberg et al. | |
| 2017/0173877 A1 | 6/2017 | Myerberg et al. | |
| 2017/0203391 A1 | 7/2017 | Budge | |
| 2017/0220030 A1 | 8/2017 | Grube et al. | |
| 2017/0236639 A1 | 8/2017 | Pieper et al. | |
| 2017/0239721 A1 | 8/2017 | Buller et al. | |
| 2017/0252808 A1 | 9/2017 | Myerberg et al. | |
| 2017/0252809 A1 | 9/2017 | Myerberg et al. | |
| 2017/0252812 A1 | 9/2017 | Mykulowycz et al. | |
| 2017/0252813 A1 | 9/2017 | Myerberg et al. | |
| 2017/0252815 A1 | 9/2017 | Fontana et al. | |
| 2017/0252820 A1 | 9/2017 | Myerberg et al. | |
| 2017/0252823 A1 | 9/2017 | Sachs et al. | |
| 2017/0252851 A1 | 9/2017 | Fulop et al. | |
| 2017/0282283 A1 | 10/2017 | Burke et al. | |
| 2017/0284876 A1 | 10/2017 | Moorlag et al. | |
| 2017/0304896 A1 | 10/2017 | Kovalchuk et al. | |
| 2017/0312967 A1 | 11/2017 | Williams et al. | |
| 2017/0320277 A1 | 11/2017 | Wang | |
| 2017/0341306 A1 | 11/2017 | Burke et al. | |
| 2018/0009052 A1 | 1/2018 | Struksnes et al. | |
| 2018/0050414 A1 | 2/2018 | Hughes | |
| 2018/0071825 A1 | 3/2018 | Schmitt et al. | |
| 2018/0126671 A1 | 5/2018 | Wilenski et al. | |
| 2018/0154586 A1 | 6/2018 | Wang et al. | |
| 2018/0159288 A1 | 6/2018 | Wright | |
| 2018/0178314 A1 | 6/2018 | Maccormack et al. | |
| 2018/0194068 A1 | 7/2018 | Burke et al. | |
| 2018/0222119 A1 | 8/2018 | Burke et al. | |
| 2018/0281064 A1* | 10/2018 | Takahashi | C23C 28/00 |
| 2018/0297272 A1 | 10/2018 | Preston et al. | |
| 2018/0304370 A1 | 10/2018 | Myerberg et al. | |
| 2018/0311738 A1 | 11/2018 | Myerberg et al. | |
| 2018/0319097 A1 | 11/2018 | Narayanan et al. | |
| 2019/0001412 A1 | 1/2019 | Gibson et al. | |
| 2019/0061336 A1 | 2/2019 | Yuan et al. | |
| 2019/0091933 A1 | 3/2019 | Barbati et al. | |
| 2019/0118260 A1 | 4/2019 | Schmitt et al. | |
| 2019/0160755 A1 | 5/2019 | Blasco et al. | |
| 2019/0210294 A1 | 7/2019 | Hudelson et al. | |
| 2019/0283136 A1* | 9/2019 | Ruppenthal | B22F 10/66 |
| 2019/0283166 A1 | 9/2019 | Clark et al. | |
| 2019/0329355 A1* | 10/2019 | Gradl | B23K 26/282 |
| 2019/0381603 A1 | 12/2019 | Lan et al. | |
| 2020/0171604 A1 | 6/2020 | Masuda et al. | |
| 2020/0238447 A1 | 7/2020 | Fedyk et al. | |
| 2020/0282497 A1* | 9/2020 | Yamasaki | B22F 10/366 |
| 2020/0324356 A1* | 10/2020 | Yamasaki | B23K 9/126 |
| 2020/0391316 A1 | 12/2020 | Yamasaki et al. | |
| 2020/0400102 A1* | 12/2020 | Bulk | F02K 9/52 |
| 2021/0016381 A1 | 1/2021 | Sales | |
| 2021/0053275 A1 | 2/2021 | Burke et al. | |
| 2021/0138538 A1 | 5/2021 | Kilcoyne et al. | |
| 2021/0138572 A1 | 5/2021 | Taig et al. | |
| 2021/0252642 A1 | 8/2021 | Williams et al. | |
| 2022/0205411 A1 | 6/2022 | Bulk et al. | |
| 2023/0144822 A1 | 5/2023 | Sales | |
| 2023/0173601 A1 | 6/2023 | Gruber et al. | |
| 2023/0182228 A1 | 6/2023 | Burke et al. | |
| 2023/0407821 A1* | 12/2023 | Shah Khadri | B22F 5/10 |
| 2024/0017340 A1 | 1/2024 | Konrath et al. | |
| 2024/0077849 A1 | 3/2024 | McCallum et al. | |
| 2024/0116123 A1 | 4/2024 | Burke et al. | |
| 2024/0123532 A1 | 4/2024 | Reid et al. | |
| 2024/0307969 A1 | 9/2024 | Fuller et al. | |
| 2024/0351130 A1 | 10/2024 | Burke et al. | |
| 2024/0390986 A1 | 11/2024 | Fuller et al. | |

FOREIGN PATENT DOCUMENTS

| | | |
|---|---|---|
| CN | 105690771 A | 6/2016 |
| CN | 107206536 A | 9/2017 |
| CN | 107206536 B | 11/2019 |
| CN | 111014883 A | 4/2020 |
| EP | 2539100 A1 | 1/2013 |
| EP | 3022004 A1 | 5/2016 |
| EP | 3204223 A1 | 8/2017 |
| EP | 3229997 A1 | 10/2017 |
| EP | 4074956 A1 | 10/2022 |
| EP | 4309831 A1 | 1/2024 |
| EP | 4382245 A1 | 6/2024 |
| EP | 4450189 A1 | 10/2024 |
| EP | 4613405 A3 | 2/2026 |
| GB | 2549653 A | 10/2017 |
| GB | 2491472 B | 6/2018 |
| GB | 2549653 B | 1/2019 |
| HK | 1245719 B | 10/2019 |
| IN | 202314082744 A | 6/2024 |
| JP | S5853382 A | 3/1983 |
| JP | S6021385 A | 2/1985 |
| JP | 2015160217 A | 9/2015 |
| JP | 2018503535 A | 2/2018 |
| JP | 2018507317 A | 3/2018 |
| JP | 6532947 B2 | 5/2019 |
| JP | 2019195848 A | 11/2019 |
| JP | 6847152 B2 | 3/2021 |
| JP | 2024084709 A | 6/2024 |
| KR | 101614860 B1 | 4/2016 |
| KR | 20240010440 A | 1/2024 |
| MX | 2017007479 A | 5/2018 |
| WO | 1996011117 A1 | 4/1996 |
| WO | 2006133034 A1 | 12/2006 |
| WO | 2015180639 A1 | 12/2015 |
| WO | 2016094660 A1 | 6/2016 |
| WO | 2016162637 A1 | 10/2016 |
| WO | 2017073947 A1 | 5/2017 |
| WO | 2017151837 A1 | 9/2017 |
| WO | 2017152104 A2 | 9/2017 |
| WO | 2017152133 A1 | 9/2017 |
| WO | 2017152142 A1 | 9/2017 |
| WO | 2017180314 A1 | 10/2017 |
| WO | 2018191728 A1 | 10/2018 |
| WO | 2019055557 A1 | 3/2019 |
| WO | 2019078974 A1 | 4/2019 |
| WO | 2019079497 A1 | 4/2019 |
| WO | 2019079737 A1 | 4/2019 |
| WO | 2019079756 A1 | 4/2019 |
| WO | 2019118914 A1 | 6/2019 |
| WO | 2019133099 A1 | 7/2019 |
| WO | 2019136222 A1 | 7/2019 |
| WO | 2019157127 A1 | 8/2019 |
| WO | 2019157253 A1 | 8/2019 |
| WO | 2019157284 A1 | 8/2019 |
| WO | 2019246253 A1 | 12/2019 |

(56)                References Cited

FOREIGN PATENT DOCUMENTS

WO        2019246308 A1    12/2019
WO        2020033337 A1    2/2020
WO        2022099354 A1    5/2022

OTHER PUBLICATIONS

Extended European Search Report for European Application No. 24164296.6, Search completed Aug. 30, 2024, Mailed Sep. 20, 2024, 12 Pgs.
Atefi et al., "Optimum Dimensions of Cooling Channels for a Regeneratively Cooled Engine: A Multi-Objective Approach", AIAA Propulsion and Energy 2021 Forum, p. 3579, 2021.
Blakey-Milner et al., "Metal Additive Manufacturing in Aerospace: A Review", Materials & Design, Elsevier, Amsterdam, NL, Jul. 24, 2021, vol. 209, XP086795851, ISSN: 0264-1275, DOI: 10.1016/J. MATDES.2021.110008.
Co-Pending U.S. Appl. No. 17/169,158, Inventors Taigelad et al., filed Feb. 5, 2021, 73 pgs.
Co-Pending U.S. Appl. No. 17/193,218, Inventors Burkepaul et al., filed Mar. 5, 2021, 40 pgs.
Co-pending U.S. Appl. No. 15/619,401, inventors Burke et al., filed Jun. 9, 2017, 51 pgs.
Co-pending U.S. Appl. No. 15/636,591, inventors Burke et al., filed Jun. 28, 2017, 50 pgs.
Co-pending U.S. Appl. No. 15/900,512, filed Feb. 20, 2018, 51 pgs.
Co-pending U.S. Appl. No. 15/941,375, filed Mar. 30, 2018, 65 pgs.
Co-Pending U.S. Appl. No. 16/683,760, filed Nov. 14, 2019, 74 pgs.
Co-Pending U.S. Appl. No. 16/860,809, filed Apr. 28, 2020, 110 pgs.
Co-Pending U.S. Appl. No. 16/933,637, filed Jul. 20, 2020, 61 pgs.
Co-Pending U.S. Appl. No. 16/983,686, filed Aug. 3, 2020, 54 pgs.
Co-pending U.S. Appl. No. 16/999,731, filed Aug. 21, 2020, 103 pgs.
Extended European Search Report for European Application No. 15867808.6, Search Completed Aug. 20, 2018, Mailed Aug. 30, 2018, 7 pgs.
Extended European Search Report for European Application No. 23185960.4, Search completed Dec. 13, 2023, Mailed Dec. 22, 2023, 20 pgs.
International Preliminary Report on Patentability for International Application PCT/US2015/065003, Report issued Jun. 13, 2017, Mailed on Jun. 22, 2017, 12 pgs.
International Search Report and Written Opinion for International Application No. PCT/US2015/065003, Search completed Feb. 24, 2016, Mailed Mar. 9, 2016, 14 pgs.
International Search Report and Written Opinion for International Application No. PCT/US2018/038052, Search completed Sep. 11, 2018, Mailed Sep. 20, 2018, 11 pgs.
International Search Report and Written Opinion for International Application No. PCT/US2019/022785, Search Completed Jun. 25, 2019, Mailed Jun. 25, 2019, 14 pgs.
International Search Report and Written Opinion for International Application No. PCT/US2019/037971, Search completed Aug. 27, 2019, Mailed Sep. 23, 2019, 12 pgs.
International Search Report and Written Opinion for International Application No. PCT/US2019/045177, Search completed Dec. 6, 2019, Mailed Dec. 6, 2019, 10 Pgs.
Notice of Allowance dated Jan. 12, 2018, for U.S. Appl. No. 15/636,591, 16 pgs.
Notice of Allowance dated Jan. 25, 2018, for U.S. Appl. No. 15/619,401, 23 pgs.
Notice of Allowance dated Jun. 21, 2018, for U.S. Appl. No. 15/636,591, 6 pgs.
Notice of Allowance dated May 31, 2018, for U.S. Appl. No. 14/965,275, 13 pgs.
U.S. Appl. No. 14/965,275 Office Action dated Jan. 3, 2018, 27 pgs.
U.S. Appl. No. 15/619,401 Office Action mailed Sep. 22, 2017, 22 pgs.
U.S. Appl. No. 15/636,591 Office Action dated Nov. 17, 2017, 27 pgs.
U.S. Appl. No. 15/636,591 Office Action mailed Aug. 21, 2017, 13 pgs.
U.S. Appl. No. 15/900,512 Office Action dated Feb. 6, 2020, 26 pgs.
U.S. Appl. No. 15/941,375 Notice of Allowance dated Jan. 18, 2019, 27 pgs.
U.S. Appl. No. 15/941,375 Office Action dated Jun. 14, 2018, 17 pgs.
U.S. Appl. No. 15/941,375 Office Action dated Oct. 18, 2018, 24 pgs.
"Copper Laminated Flexible Shunts", Bajeria Industries, 2016, Retrieved copy: May 27, 2021, Available at: http://www.bajeria.com/copper-laminated-flexible-shunts.html., 30 pgs.
Bhatt et al., "Optimizing Multi-Robot Placements for Wire Arc Additive Manufacturing", International Conference on Robotics and Automation (ICRA), IEEE, May 23, 2022, pp. 7942-7948, XP034146981, doi: 10.1109/ICRA46639.2022.9812318 [retrieved on Jul. 12, 2022].
Sames et al., "The Metallurgy and Processing Science of Metal Additive Manufacturing.", International Materials Reviews, vol. 61, No. 5, 2016, pp. 315-360, doi: 10.1080/09506608.2015.1116649.

* cited by examiner

| Key | |
|---|---|
| LB / EB-PBF | Powder bed / DMLS |
| BJT | Binder Jetting |
| Metal FDM | Fused Deposition Modeling |
| Powder Deposition | Freeform powder (EBAM, laser) |
| Wire Deposition | Freeform wire (WAAM, laser, EB) |

FIG. 9a

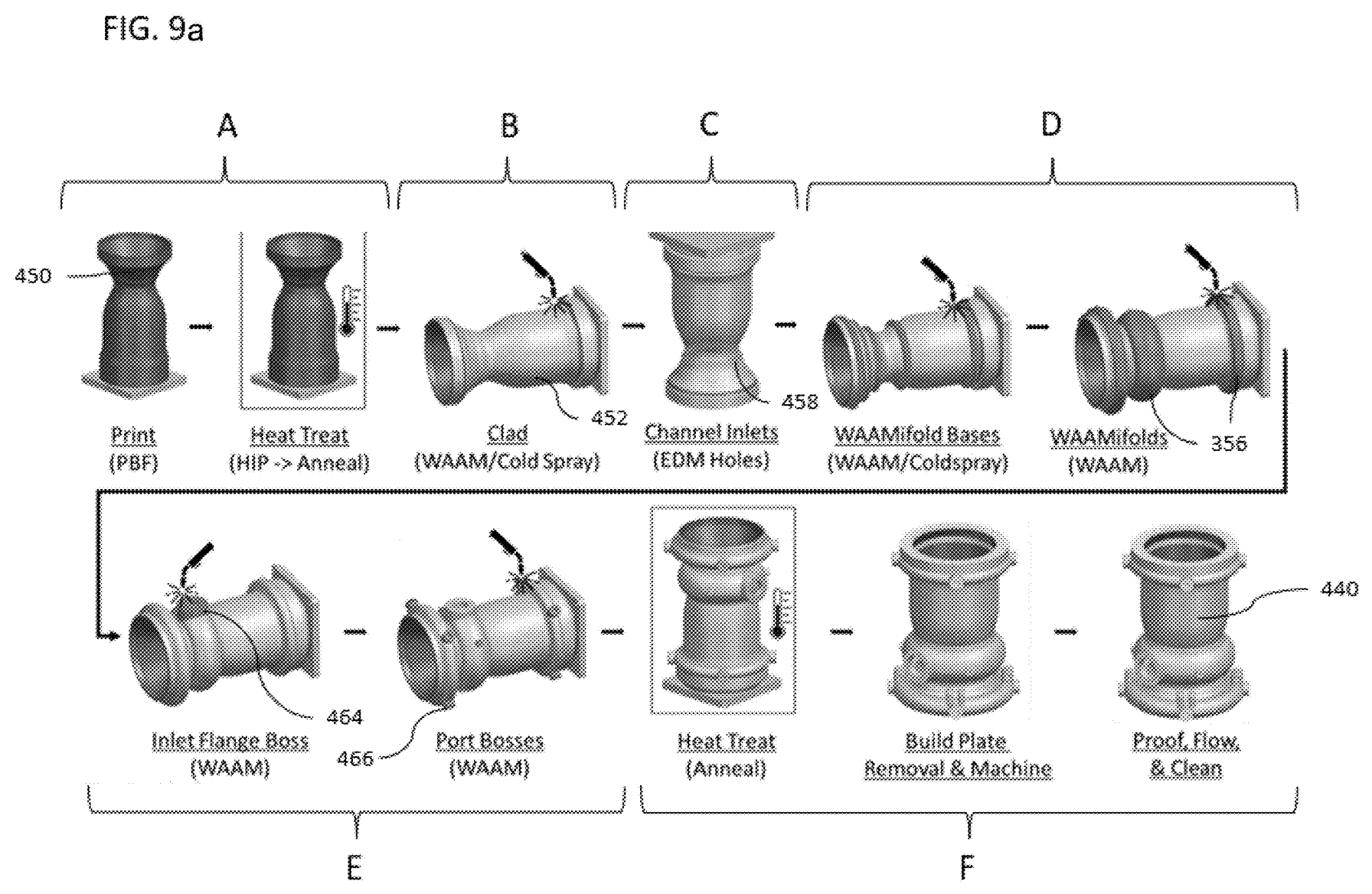

A
Print (PBF)
450
Heat Treat (HIP -> Anneal)

B
Clad (WAAM/Cold Spray)
452

C
Channel Inlets (EDM Holes)
458

D
WAAMifold Bases (WAAM/Coldspray)
WAAMifolds (WAAM)
356

E
Inlet Flange Boss (WAAM)
464
Port Bosses (WAAM)
466

F
Heat Treat (Anneal)
Build Plate Removal & Machine
Proof, Flow & Clean
440

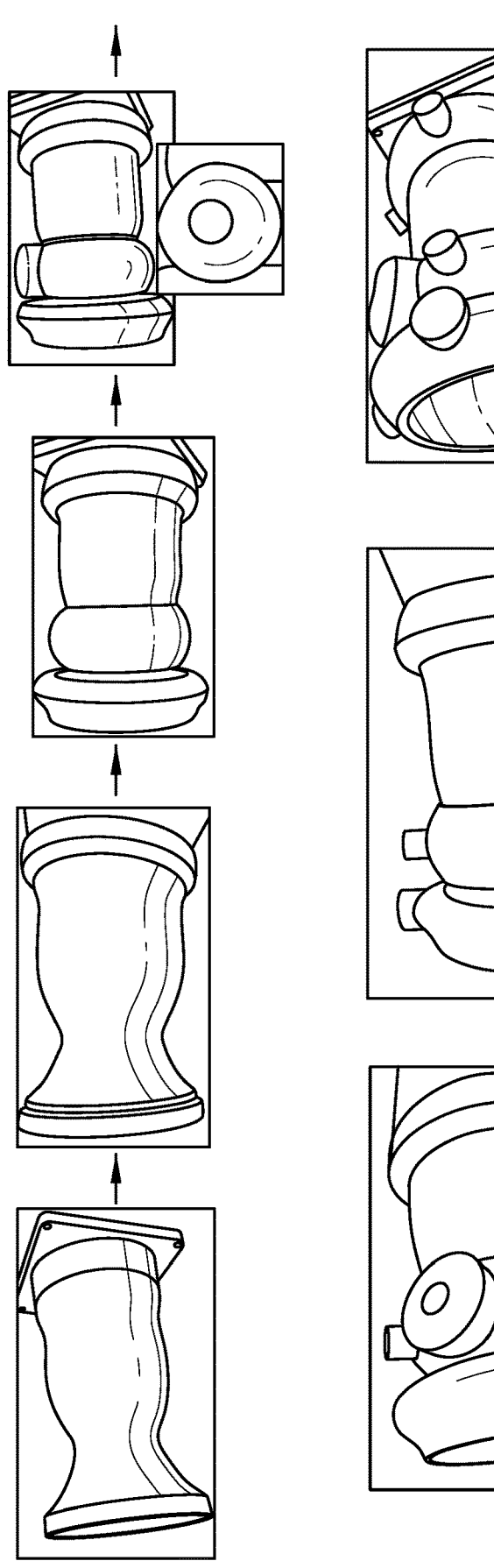
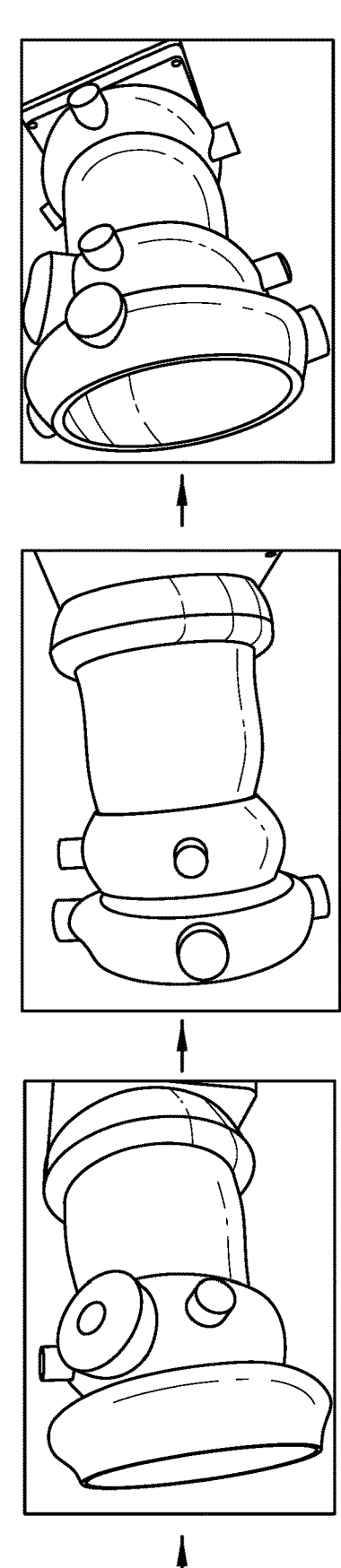
FIG.9b

WAAM/CS Joint initial cross-sections

FIG.10c

TABLE: Material Combinations

| Part | Material Classes | Materials | Additive Techniques |
|---|---|---|---|
| Substrate | Copper Alloys | GRCOP-42 | PBF |
| Structural Jacket (Cladding) | Nickel, Titanium, Aluminum, Steel, Aluminum MMC, Steel MMC, Nickel MMC, High Entropy, Niobium | Inconel-625, Inconel-718, Haynes-233, Haynes-282, Ti-6-4, CHEM-2, CHEM-3, 15-5 PH Steel, Custom 465, C300 Maraging Steel, Aermet100, AF1410, Aluminum MMC, Steel MMC, Nickel MMC, High Specific Strength HEA, C103 Niobium Refractory HEA | WAAM/ Cold Spray/ DED |
| Port | | | |
| Manifolds | | | |
| Flanges | | | |
| Brackets | | | |
| Clevis | | | |
| Skirt/Nozzle | | | |
| Structural Mounting Pads | | | |

Outer (closeout)

Inner (hot gas wall)

FIG.18

| | | Thickness Required [in] | Approximate Cladding Mass Reduction [%] (reduction from WAAM 625) |
|---|---|---|---|
| WAAM | 625 | 0.372 | 0% |
| WAAM | 718 | 0.164 | 56% |
| Cold Spray | 625 | 0.158 | 58% |
| Cold Spray | 718 | 0.125 | 66% |

Aeon-R Inconel Mech. Property Comparisons

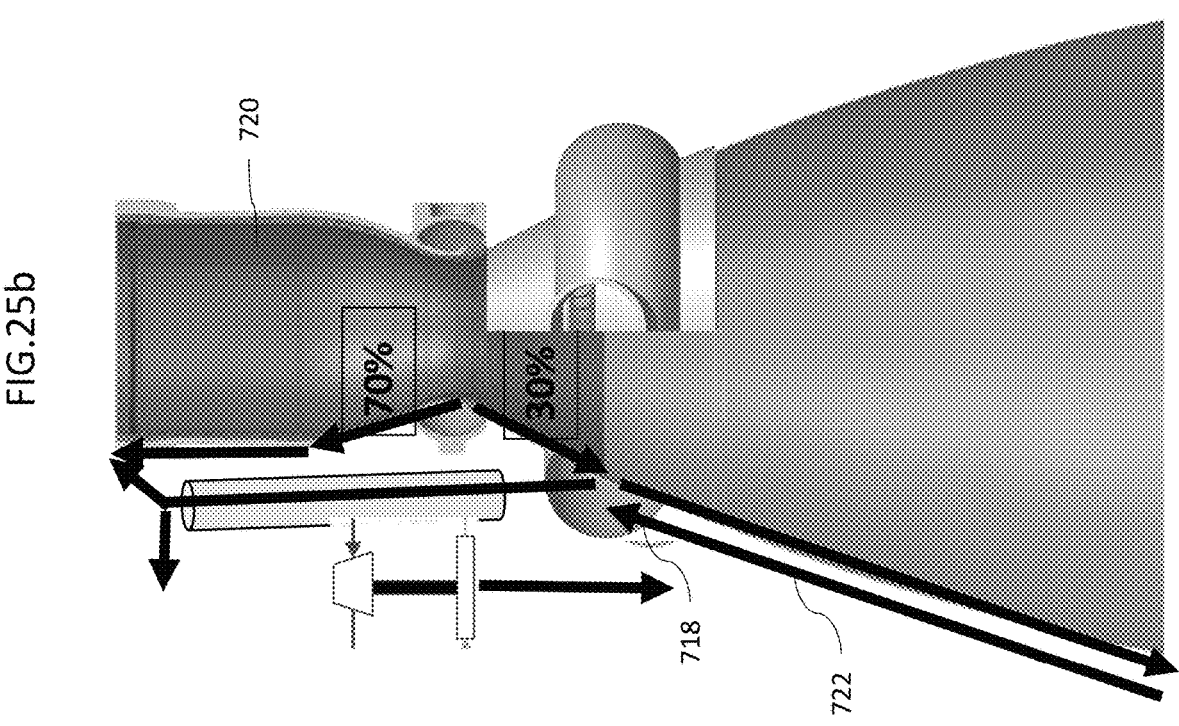
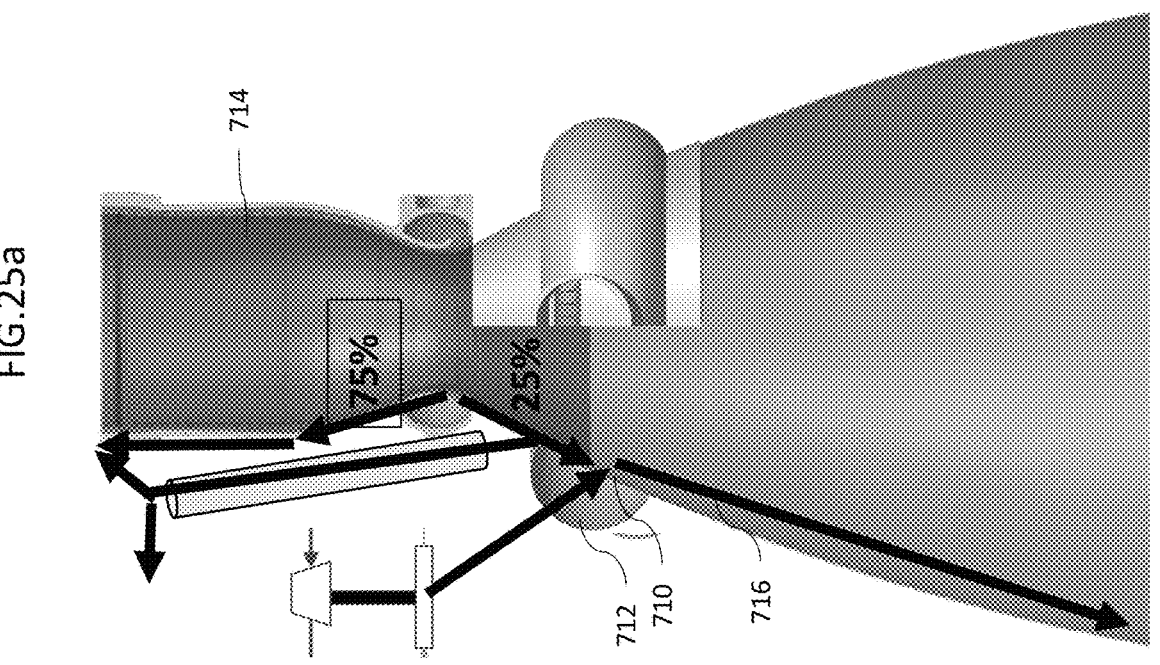

ADDITIVELY MANUFACTURED COMBUSTION CHAMBERS, MANIFOLD STRUCTURES AND HYBRID ADDITIVE PROCESSES RELATED THERETO

BENEFIT CLAIM AND INCORPORATION BY REFERENCE

This specification claims the benefit of and incorporates by reference in its entirety U.S. Provisional Patent Application No. 63/386,841, filed Dec. 9, 2022.

FIELD OF THE INVENTION

Embodiments disclosed herein relate to hybrid additive manufacturing processes and structures formed thereby; and more particularly to combustion chambers and fluid manifolds made thereby.

BACKGROUND

Additive manufacturing is a process by which a product or part is manufactured by adding one layer of material on top of another in a sequence or pattern that would result in a solid part being built. This method of manufacturing is commonly referred to as three dimensional or 3-D printing and can be done with different materials, including plastic and metal. There are many different processes available for implementing 3-D printing of articles, including, among others, direct energy deposition, wire arc additive manufacturing, powder bed fusion, cold spray, etc.

A manifold is a wide and/or bigger pipe, or channel, into which smaller pipes or channels lead. Manifolds are implemented in many different fluid control environments, for example, in an engine to collect exhaust gas from multiple cylinders into one pipe, in hydraulics to regulate fluid flow thereby controlling the transfer of power between actuators and pumps, to supply air or fuel/air mixture engines, etc. Many of these processes require manifolds able to withstand high pressure fluid flows.

SUMMARY OF THE INVENTION

Aspects of the disclosure are directed to hybrid additive manufacturing processes and structures formed thereby.

Still further aspects of the disclosure are directed to thermal combustion chambers comprising:

an integral regeneratively-cooled liner body formed of a liner body material and having an inner wall defining an open-ended tubular combustion chamber volume, an outer wall having at least one set of inlets and at least one set of outlets disposed at different heights along the length thereof, and a plurality of cooling channels formed between the inner and outer walls and in fluid communication with the at least one inlet and at least one outlet;

at least one structural cladding region formed of at least one layer of a cladding material integral with and extending around the circumference of the liner body over at least a portion of the outer wall adjacent to or overlapping the at least one set of inlets and at least one set of outlets;

at least one distinct fluid manifold disposed in association with and in fluid communication with each of the at least one set of inlets and at least one set of outlets, each of the separate fluid manifolds being integral with the at least one structural cladding region and comprising:

first and second base structures comprised of a plurality of overlapping stepped layers integral with the at least one structural cladding region and extending around the circumference of the liner body on opposing sides of the at least one set of inlets or at least one set of outlets, and an upper wall integral with and spanning between the first and second base structures to form a fluid manifold enclosure extending around the circumference of the liner body over the associated at least one set of inlets and at least one set of outlets, wherein the first and second base structures and upper wall of each fluid manifold define a fluid manifold outer wall and inner fluid conduit and are configured such that the inner fluid conduit has a generally cylindrical fluid manifold cross-section;

at least one fluid access port integrally disposed in each of the fluid manifold outer walls and having connection elements disposed thereon; and wherein the fluid manifolds, at least one set of inlets and outlets and cooling channels of the liner body define a single fluid flow path therebetween having a termination at an upper end of the thermal combustion chamber.

In yet further aspects of the disclosure, the regeneratively-cooled liner body and the fluid manifolds are formed from different materials.

In yet still further aspects of the disclosure, the cooling channels have a dimensional resolution of less than 0.05 mm.

In yet still further aspects of the disclosure, the liner body material and structural cladding material are different.

In yet still further aspects of the disclosure, the liner body material comprises a Cu-based alloy and the structural cladding material is a Ni—Cr-based alloy.

In yet still further aspects of the disclosure, the fluid manifolds are formed from the same Ni—Cr-based alloy as the structural cladding material.

In yet still further aspects of the disclosure, the fluid manifolds are formed from a different Ni—Cr-based alloy from the structural cladding material.

In yet still further aspects of the disclosure, first and second flanges are integral with at least the regeneratively-cooled liner body around the circumferences of the open-ends of the tubular combustion chamber volume.

In yet still further aspects of the disclosure, the first and second flanges form one of the first and second base structures for the separate fluid manifolds.

In yet still further aspects of the disclosure, the regeneratively-cooled liner body defines an asymmetric hour-glass such that the thermal combustion chamber volume has a first end having a circumference along the length of the chamber that converges to a narrow throat region and a second end having a circumference that expands along the length of the chamber from the narrow throat region to the second end.

In yet still further aspects of the disclosure, a first set of inlets are disposed at least along the circumference of the outer wall of the regeneratively-cooled liner body at the narrow throat region, and wherein at least one structural cladding regions is disposed atop said first set of inlets, and further wherein fluid conduits are disposed through said at least one structural cladding region to interconnect the first set of inlets to the exterior of the at least one structural cladding region.

In yet still further aspects of the disclosure, a first set of outlets are disposed at least along the circumference of the outer wall of the regeneratively-cooled liner body at the second end, and a second set of inlets are disposed at least along the circumference of the outer wall of the regeneratively-cooled liner body at the first end, and wherein the first set of outlets and second set of inlets are not covered by a structural cladding region.

In yet still further aspects of the disclosure, the separate integral fluid manifolds are formed to enclose the first and second sets of inlets and the first set of outlets.

In yet still further aspects of the disclosure, the single fluid flow path passes through the fluid access port and the fluid manifold associated with the first set of inlets, through first set of inlets to the cooling channels, through the cooling channels to the first set of outlets, through the first set of outlets and associated fluid manifold and fluid access port to a fluid conduit interconnected therewith, through the fluid conduit, and through the fluid access port and fluid manifold associated with the second set of inlets, and wherein the second set of inlets are interconnected through the regeneratively-cooled liner body to a fuel injection manifold, through the second set of inlets to the fuel injection manifold.

In yet still further aspects of the disclosure, thermal combustion chambers include a fuel injection manifold integral or interconnected with a first open end of the thermal combustion chamber volume and comprising a plurality of fuel injector elements, the plurality of fuel injector elements in fluid communication with at least the cooling channels of the regeneratively-cooled liner body.

In yet still further aspects of the disclosure, thermal combustion chambers include a thrust skirt integral with or interconnected with a second open end of the thermal combustion chamber volume and defining a generally open conical inner volume wherein the circumference of the conical inner volume expands distal to the thermal combustion chamber.

In yet still further aspects of the disclosure, the thrust skirt further includes inner and outer walls, and a plurality of cooling channels formed therebetween, the plurality of cooling channels in fluid communication with the cooling channels of the regeneratively-cooled liner body.

In yet still further aspects of the disclosure, the thrust skirt further includes:

a set of fluid inlets disposed in an outer surface thereof at a first end thereof proximal to the thermal combustion chamber;

a set of fluid outlets disposed in an outer surface thereof at a second end thereof distal to the thermal combustion chamber, wherein the set of fluid inlets and outlets are in fluid communication with the plurality of cooling channels disposed within the thrust skirt, wherein separate integral fluid manifolds are formed on the outer surface and around the circumference of the thrust skirt to enclose each of the set of fluid inlets and outlets, and are in fluid communication with separate fluid manifolds on the thrust combustion chamber.

In yet still further aspects of the disclosure, the single fluid flow path passes from a first fluid manifold associated with the regeneratively-cooled liner element, through the fluid manifold associated with the set of inlets on the thrust skirt, through the set of inlets to the cooling channels, through the cooling channels to the set of outlets on the thrust skirt to the associated fluid manifold, and through the fluid manifold associated with the set of outlets on the thrust skirt to a second fluid manifold associated with the regeneratively-cooled liner element.

4

In yet still further aspects of the disclosure, the thrust chamber includes at least a set of fluid outlets disposed in the inner wall of the thermal combustion chamber and in fluid communication with the cooling channels.

In yet still further aspects of the disclosure, the thrust chamber includes at least one integration feature integrally formed on the structural cladding region, the at least one fluid manifold, and/or the at least one fluid access port.

Various aspects of the disclosure are directed to fluid manifolds in association with and in fluid communication with a regeneratively-cooled liner body of a thermal combustion chamber, the fluid manifold being integral with the outer wall of the thermal combustion chamber and including:

first and second base structures comprising a plurality of overlapping stepped layers integral with and extending around the circumference of the thermal combustion chamber, and an upper wall integral with and spanning between the first and second base structures to form a fluid manifold enclosure extending around the circumference of the thermal combustions chamber over and associated with at least one fluid path in the thermal combustion chamber, wherein the first and second base structures and upper wall of each fluid manifold define a fluid manifold outer wall and inner fluid conduit and are configured such that the inner fluid conduit has a generally cylindrical fluid manifold cross-section.

In still further aspects, the generally cylindrical fluid manifold comprises a cross-section wherein no internal structures have an angle selected from the group consisting of, acute, right, and reflect.

In yet further aspects, the manifold includes at least one fluid access port integrally disposed on the fluid manifold outer walls and having connection elements disposed thereon.

Many aspects of the disclosure are directed to hybrid additive manufacturing methods for forming a thermal combustion chamber including:

powder bed fusion forming an integral regeneratively-cooled liner body of a liner body material and having an inner wall defining an open-ended tubular combustion chamber volume, an outer wall having at least one set of inlets and at least one set of outlets disposed at different heights along the length thereof, and a plurality of cooling channels formed between the inner and outer walls and in fluid communication with the at least one inlet and at least one outlet;

wire-arc additive manufacturing (WAAM), directed energy deposition (DED), or cold spray (CS) forming at least one structural cladding region of at least one layer of a cladding material integral with and extending around the circumference of the liner body over at least a portion of the outer wall adjacent to or overlapping the at least one set of inlets and at least one set of outlets;

WAAM or DED forming at least one distinct fluid manifold disposed in association with and in fluid communication with each of the at least one set of inlets and at least one set of outlets, such that each distinct fluid manifold is integral with the at least one structural cladding region and includes:

first and second base structures comprising a plurality of overlapping stepped layers integral with the at least one structural cladding region and extending around the circumference of the liner body on oppos-
ing sides of the at least one set of inlets or at least one
set of outlets, and an upper wall integral with and spanning between the
first and second base structures to form a fluid
manifold enclosure extending around the circumfer-
ence of the liner body over the associated at least one
set of inlets and at least one set of outlets, wherein the first and second base structures and upper
wall of each fluid manifold define a fluid manifold
outer wall and inner fluid conduit and are configured
such that the inner fluid conduit has a generally
cylindrical fluid manifold cross-section;

WAAM or DED forming at least one fluid access port
integrally disposed in each of the fluid manifold outer
walls and having connection elements disposed
thereon; and wherein the fluid manifolds, at least one set of inlets and
outlets, and cooling channels of the liner body define a
single fluid flow path therebetween having a termina-
tion at an upper end of the thermal combustion cham-
ber.

In still further aspects of the disclosure, at least the
regeneratively-cooled liner body and the fluid manifolds are
formed from different materials.

In yet further aspects of the disclosure, the cooling
channels have a dimensional resolution of less than 0.05
mm.

In yet still further aspects of the disclosure, the liner body
material and structural cladding material are different.

In yet still further aspects of the disclosure, the liner body
material comprises a Cu-based alloy and the structural
cladding material is a Ni—Cr-based alloy.

In yet still further aspects of the disclosure, the fluid
manifolds are formed from a Ni—Cr-based alloy. In some
embodiments, the Ni—Cr-based alloy forming the fluid
manifolds is the same Ni—Cr-based alloy as the structural
cladding material. In other embodiments, the Ni—Cr-based
alloy forming the fluid manifolds is not the same Ni—Cr-
based alloy as that forming the structural cladding material,
i.e., it differs from the Ni—Cr-based alloy forming the
structural cladding material.

In yet still further aspects of the disclosure, methods
include, WAAM or DED forming first and second flanges
integral with at least the regeneratively-cooled liner body
around the circumferences of the open-ends of the tubular
combustion chamber volume.

In yet still further aspects of the disclosure, the first and
second flanges form one of the first and second base struc-
tures for the distinct fluid manifolds.

In yet still further aspects of the disclosure the regenera-
tively-cooled liner body defines an asymmetric hour-glass
such that the thermal combustion chamber volume has a first
end having a circumference along the length of the chamber
that converges to a narrow throat region and a second end
having a circumference that expands along the length of the
chamber from the narrow throat region to the second end.

In yet still further aspects of the disclosure, a first set of
inlets are disposed at least along the circumference of the
outer wall of the regeneratively-cooled liner body at the
narrow throat region, and at least one structural cladding
regions are disposed atop said first set of inlets, and wherein,
with electrical discharge machining (EDM), fluid conduits
are formed through said at least one structural cladding
region to interconnect the first set of inlets to the exterior of
the at least one structural cladding region.

In yet still further aspects of the disclosure, methods
include forming a first set of outlets disposed at least along
the circumference of the outer wall of the regeneratively-
cooled liner body at the second end, and a second set of
inlets disposed at least along the circumference of the outer
wall of the regeneratively-cooled liner body at the first end,
and wherein the first set of outlets and second set of inlets
are not covered by a structural cladding region.

In yet still further aspects of the disclosure, the separate
integral fluid manifolds are formed to enclose the first and
second sets of inlets and the first set of outlets.

In yet still further aspects of the disclosure, methods
include, PBF, WAAM, or DED forming a thrust skirt integral
with or interconnected with a second open end of the thermal
combustion chamber volume and defining a generally open
conical inner volume, wherein the circumference of the
conical inner volume expands distal to the thermal combus-
tion chamber.

In yet still further aspects of the disclosure, the thrust skirt
further comprises inner and outer walls, and a plurality of
cooling channels formed therebetween, the plurality of cool-
ing channels in fluid communication with the cooling chan-
nels of the regeneratively-cooled liner body.

In yet still further aspects of the disclosure, the thrust skirt
further includes:

a set of fluid inlets disposed in an outer surface thereof at
a first end thereof proximal to the thermal combustion
chamber;

a set of fluid outlets disposed in an outer surface thereof
at a second end thereof distal to the thermal combustion
chamber, wherein the set of fluid inlets and outlets are in fluid
communication with the plurality of cooling channels
disposed within the thrust skirt, wherein separate integral fluid manifolds are formed on
the outer surface and around the circumference of the
thrust skirt to enclose each of the set of fluid inlets and
outlets, and are in fluid communication with fluid
separate fluid manifolds on the thrust combustion
chamber, and wherein the separate integral fluid manifolds are formed
using WAAM or DED.

In yet still further aspects of the disclosure, methods
include, WAAM or DED forming at least one integration
feature integrally on at least one element selected from the
group consisting of: the structural cladding region, the at
least one fluid manifold, and the at least one fluid access
port.

In yet still further aspects of the disclosure, methods
include annealing, depowdering, cleaning, and/or testing.

Several aspects of the disclosure are directed to hybrid
additive manufacturing processes including:

analyzing a part to be formed to categorize necessary a
plurality of build features selected from the group
consisting of part size, part materials and feature reso-
lution such that a build structure is defined;

dividing the build structure into a plurality of build
sections based on the plurality of build features
required for each build section;

define a set of interfaces between the plurality of build
sections where adjacent build features are incompatible
with a single build modality;

mapping a build path across the plurality of build sections
such that different additive manufacturing processes
are used in adjacent build sections to form an integral
section of the part across the interface therebetween.

In still further aspects of the disclosure, the additive manufacture processes are selected from the group consisting of PBF, WAAM, DED, and CS.

In yet further aspects of the disclosure, different materials are used across at least one interface of the part.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures and data graphs, which include various embodiments of the disclosure and should not be construed as a complete recitation of the scope of the disclosure, wherein:

FIG. 9a provides a schematic flow-chart of a hybrid additive manufacturing process for thrust chambers in accordance with aspects of the disclosure.

FIG. 9b provides images of thrust chambers formed using a hybrid additive manufacturing process in accordance with aspects of the disclosure.

FIG. 10c provides a table of materials for use in hybrid additive manufacturing processes in accordance with aspects of the disclosure.

FIG. 18 provides a table of cladding mass reduction in accordance with aspects of the disclosure.

FIGS. 25a and 25b provide cross-sections of thrust chambers with lower skirts showing fuel flow in accordance with aspects of the disclosure.

DETAILED DESCRIPTION

It will be understood that the components of the embodiments as generally described herein and illustrated in the appended figures may be arranged and designed in a variety of different configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment. Thus, the phrases "in one embodiment", "in an embodiment", and similar language throughout this specification may, but do not necessarily, all refer to the same embodiment.

Rocket engines use stored rocket propellants as the reaction mass for forming a high-speed propulsive jet of fluid, usually high-temperature gas. Rocket engines are reaction engines, producing thrust by ejecting mass rearward, in accordance with Newton's third law. Most rocket engines use the combustion of reactive chemicals to supply the necessary energy, but non-combusting forms such as cold gas thrusters and nuclear thermal rockets also exist.

Figure 1:
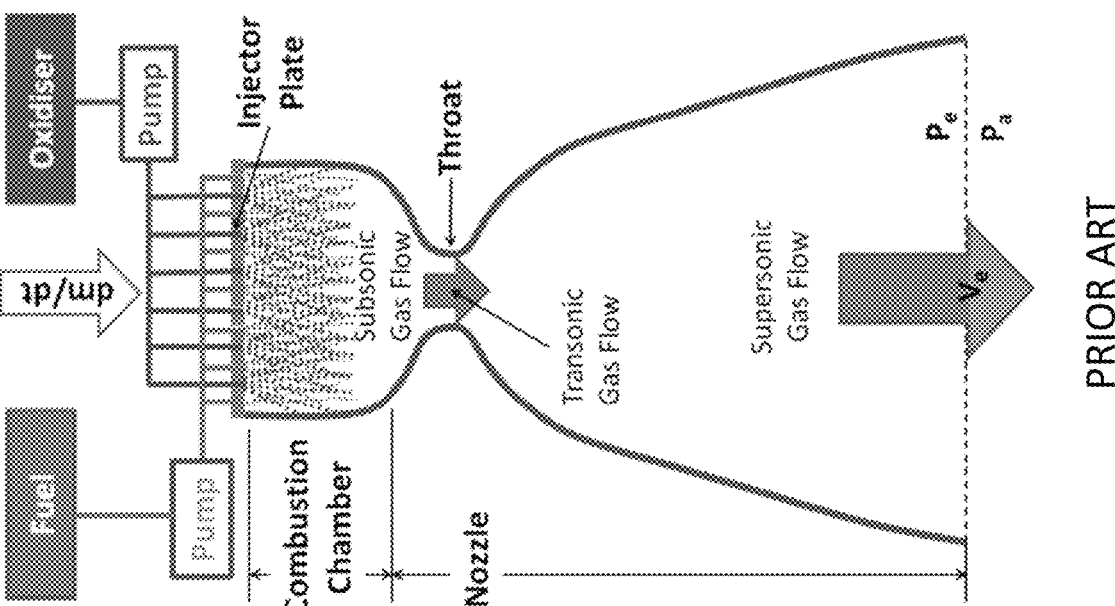
FIG. 1 provides a schematic of a thrust chamber in accordance with aspects of the prior art.

As shown schematically in FIG. 1, rocket engines generally comprise a main thrust chamber assembly fed through a series of inlets and injectors with a mixture of fuel and oxidizer through a series of high pressure fluid handling manifolds. The combustion a subsonic flow of gas is created by the combustion of the fuel and oxidizer in the combustion chamber that is accelerated to transonic speeds at a narrowing of the chamber called a throat, which ultimately produces an expanding supersonic gas flow in the nozzle skirt which is the terminus of the engine. Traditionally, the various fluid handling components of rocket engine are separately manufactured and then assembled together through welding, brazing, or other fasteners. While this conventional manufacturing process allows for each component of the rocket engine to be of a relatively simple and conventional design, the number and assembly of components creates a highly complex process. Moreover, changes in engine design often require a complete redesign of multiple components of the engine. The combination of these factors leads to an overall process that is expensive and time consuming from design to prototyping to final manufacture.

Additive manufacturing is the process of creating an object by building one layer at a time. This process can be contrasted with conventional molding or casting techniques, in which components of an object are created in a single step via a premade mold of the object and then assembled together. When manufacturing complex devices, additive manufacturing has the distinct benefit of being able to produce many geometries using a variety of functionally graded materials, thereby permitting the integration of many previously distinct components into a single integral piece. By contrast, conventional manufacturing typically requires the formation of numerous components which then must be assembled to form a whole. Additive manufacturing eliminates that barrier. This also means that manufacturers can eliminate weight from an object. This is particular important in the aerospace and automobile industries, where weight can affect the functionality of a final product.

Figure 2:
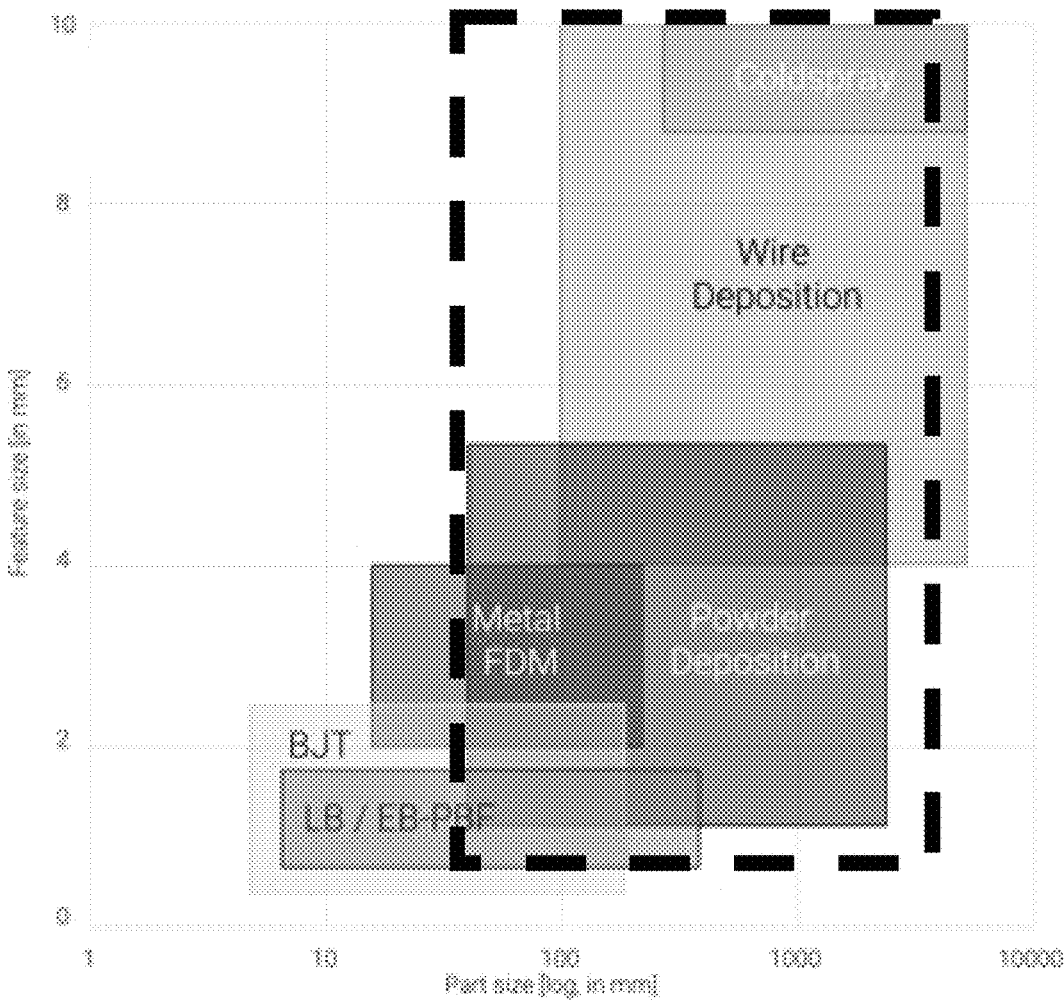
FIG. 2 provides a plot of the capabilities of various additive manufacturing techniques against part size and feature size in accordance with aspects of the disclosure.

Additive manufacturing, however, creates a challenge, primarily in ensuring that the final part has adequate engineering properties. Specifically, additive manufacturing is a genus term that actually references a number of different techniques, including, for example, binder jetting (BJT), cold spray additive manufacturing (CS), directed energy deposition (DED), wire arc additive manufacturing (WAAM) or directed energy deposition-arc (DED-arc), material extrusion, and powder bed fusion (PBF) (which itself encompasses a variety of techniques including direct metal laser melting (DMLM), direct metal laser sintering (DMLS), electron beam melting (EBM), selective laser sintering (SLS) and selective heat sintering (SHS)), and sheet lamination, including laminated object manufacturing (LOM) and ultrasonic additive manufacturing (UAM), among others. Each of these species of the additive manufacturing genus has different capabilities in terms of material limitations, overall part size attainable, individual feature size available, etc. Specifically, as shown in FIG. 2 a large complex device, such as a rocket engine, may require the creation of overall large parts (e.g., in the tens of meters range) with small individual features (e.g., often in the millimeter or submillimeter range). No single additive manufacturing technique available today is suitable for such a wide range of feature and part size requirements. For example, while a technique like WAAM may be able to produce parts of sufficient scale, its feature resolution does not allow the reproduction of small details that may be necessary in complex flow channels. Similarly, while PBF may be able to reproduce very small features, it is impossible to produce large scale parts using available techniques.

Hybrid Additive Process Aspects

Aspects of the disclosure provide additively manufactured thrust chambers and thrust chambers with integral fluid manifolds, and hybrid additive manufacturing methods for their production. In various aspects hybrid additive manufacturing techniques may combine a variety of processes including, WAAM, PBF, cold spray and DED, for example, to produce objects with variant dimensional requirements, i.e., large overall size and small features. Hybrid additive manufacturing may be defined as a process by which various process layers within any manufactured object are divided between different additive manufacturing techniques. These process layers in turn allow for the introduction of variable feature and size distribution throughout the manufactured object. Hybrid process layers according to aspects may also allow the use of a variety of materials or may use a single material across the various process layers.

In many aspects hybrid additive manufacturing may be used to form thrust chamber assemblies including fluid manifolds for various applications, including rocket engines. In aspects where fluid manifolds are formed, such manifolds may be formed in-situ on and integral with thrust chamber assemblies to provide single piece components for rocket engines. Such integral combustion chamber/fluid manifolds may also be combined with other elements formed using hybrid additive manufacturing, including, for example, injectors, thrust skirts, etc.

As described hybrid additive technology is the combination of different species of additive manufacturing to create a whole integral part have variant dimensional and/or material requirements. Although the above and following discussion will focus on the use of hybrid additive techniques for rocket engines generally, and thrust chambers and fluid manifolds associated with thrust chambers more specifically, it will be understood that many such hybrid techniques could be used in accordance with the aspects and embodiments described herein.

Figures 3A, 3B:
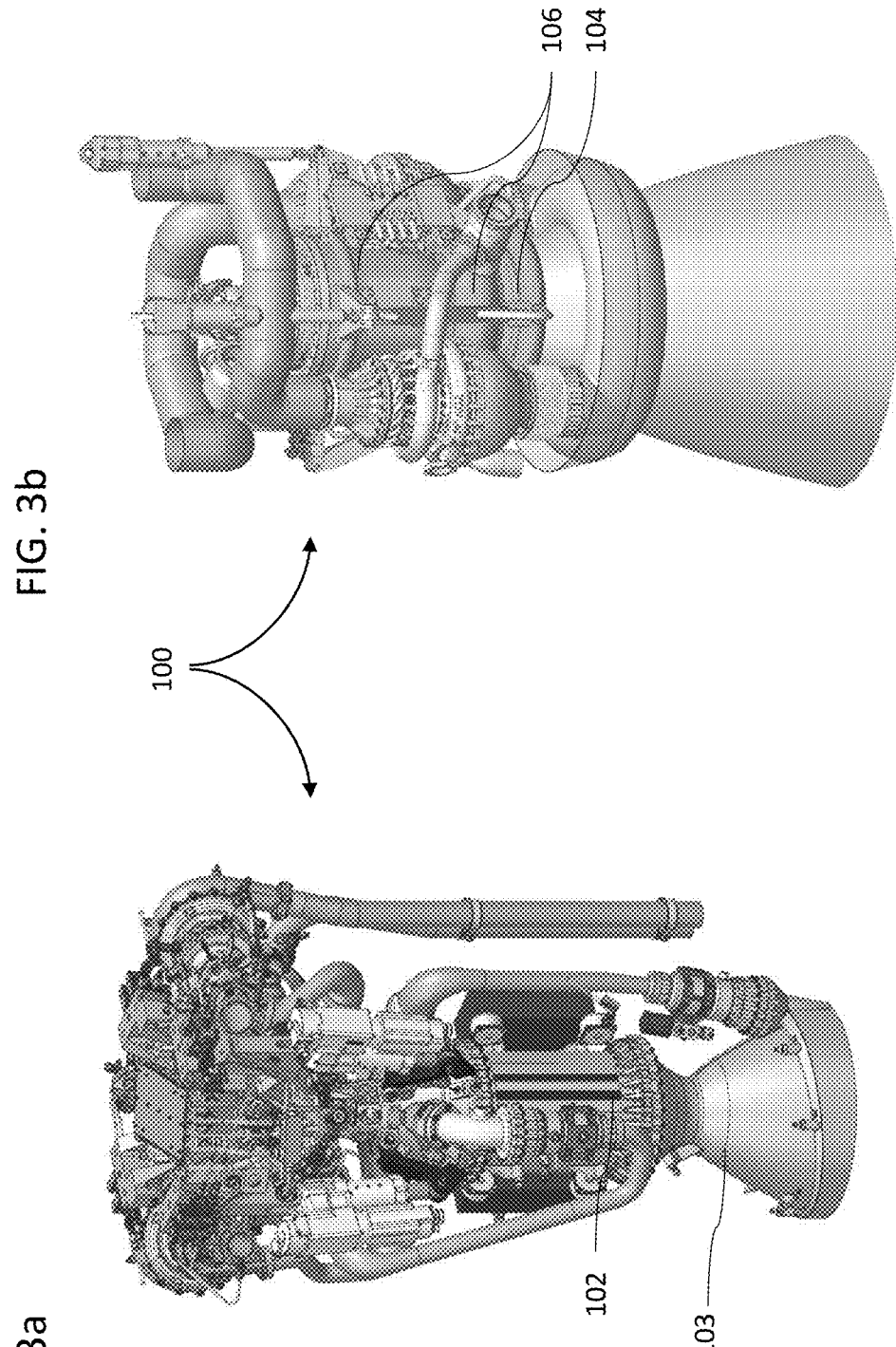
FIG. 3a provides a schematic of a thrust chamber and surrounding elements in accordance with the prior art.
FIG. 3b provides a schematic of a thrust chamber and surrounding elements in accordance with aspects of the disclosure.

Turning first to FIG. 3a, rocket engines (100) are highly complex machines that incorporate many individual parts. What is more, these parts must withstand extreme conditions; for example, pressures within the engines range into the thousands of psi, and they are exposed to temperatures ranging from sub-zero to hundreds of degrees Celsius. Typically, as shown in FIG. 3a, manufacturing has focused on individually formed parts that can meet these extreme conditions that are then assembled together using conventional techniques. In particular, in these conventional designs even where one or more components of the engine, such as the thrust chamber (102), is additively manufactured, it would be manufactured as a collection of separate additively manufactured components that would then be joined with the other components (e.g., fluid manifolds) by welding, brazing or other conventional fasteners. As discussed, one of the reasons for the continued use of such conventional manufacturing and assembly techniques is that no single conventional additive manufacturing process provides the necessary flexibility to allow full additive manufacturing of all portions of the thrust chamber assembly. For example, the overall size of a rocket engine thrust chamber (102) or skirt (103) may be many meters in cross section; however, embedded within these large parts are features (e.g., fluid handling inlets, injectors or cooling liners, etc.) that may have features having millimeter or even submillimeter scales. Accordingly, many of the benefits of additive manufacturing, including reduced manufacturing complexity by combining elements and reduced assembly are lost.

Figures 4A, 4B, 4C:
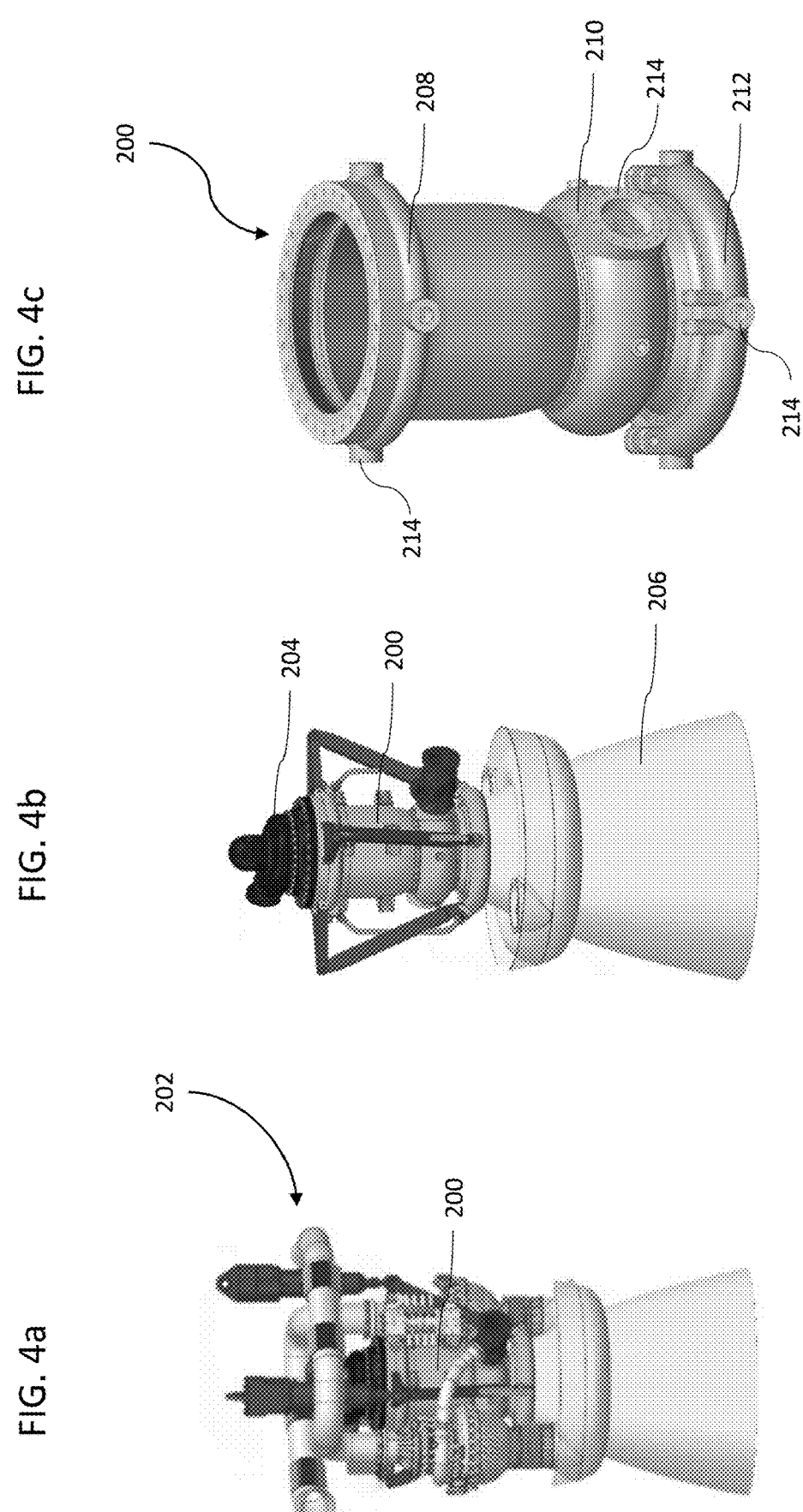
FIG. 4a provides a schematic of a thrust chamber and surrounding elements in accordance with aspects of the disclosure.
FIG. 4b provides a schematic of a thrust chamber and surrounding elements in accordance with aspects of the disclosure.
FIG. 4c provides a schematic of a thrust chamber in accordance with aspects of the disclosure.

Aspects of the disclosure are directed to additively manufactured thrust chambers incorporating integral fluid manifolds and other elements as will be discussed in detail below. An aspect of such additively manufactured thrust chamber (104) is provided in FIG. 3b, and is shown with fluid manifolds (106) integrated into the thrust chamber body. As shown in FIGS. 4a and 4b, the thrust chamber assembly (200) makes up a part of the overall rocket engine (202), and sits between the injector assembly (204) which introduces a fuel/oxidant mixture into the thrust chamber, and a nozzle skirt (206), which controls and directs the thrust generated by the combustion of the fuel/oxidant mixture in the thrust chamber assembly. The manifolds (208, 210 and 212) integrated into the thrust chamber direct the flow of fuel and regenerative gases into the injector assembly and the combustion chamber through a variety of inlets and other conduits.

As can be appreciated in FIG. 4c, a thrust chamber assembly according to aspects of the disclosure incorporates manifolds (208, 210 and 212) that are fully integrated as part of the overall thrust chamber assembly. As further seen, these manifolds may be further integrated with a plurality of interfaces (214) formed or machined into the manifolds such that the multiple components of the conventional thrust chamber assembly (including interfaces and manifolds) may be integrated into a unified whole thus reducing the overall complexity of the manufacture and assembly of the thrust chamber and the overall rocket engine.

Figures 5A, 5B:
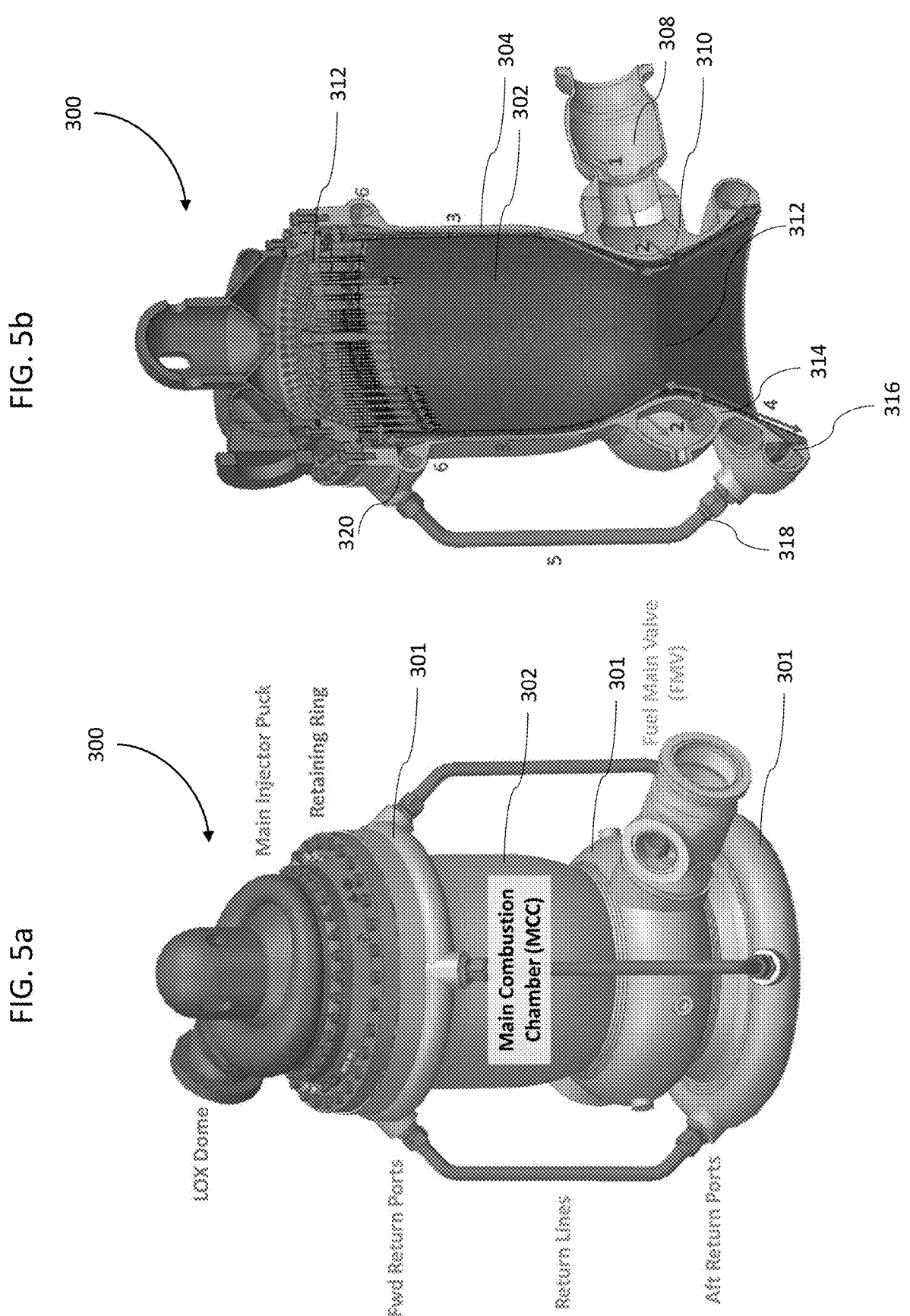
FIG. 5a provides a schematic of a thrust chamber in accordance with aspects of the disclosure.
FIG. 5b provides a cross-section of a thrust chamber showing fuel flow in accordance with aspects of the disclosure.

A schematic and cross-section of a thrust chamber according to aspects are provided in FIGS. 5a and 5b and help to illustrate the complexity that has prevented the adoption of conventional additive techniques with the formation of thrust chamber assemblies. In particular, in order to operate properly, thrust chamber assemblies (300) use regenerative cooling by which fuel (the flow of which is illustrated by the arrows in FIG. 5b), supplied by the manifolds (301) is pumped around the outside of the combustion chamber (302) between the combustion chamber itself (302) and an outer shell (304) that conforms to the chamber which is separated by a narrow gap or liner on the order of millimeters. This regenerative liner (306) is generally designed to have a high surface area such that fuel flows through the liner and absorbs heat very efficiently, thus allowing for the use of more energetic fuels and higher chamber pressures.

Figure 6A:
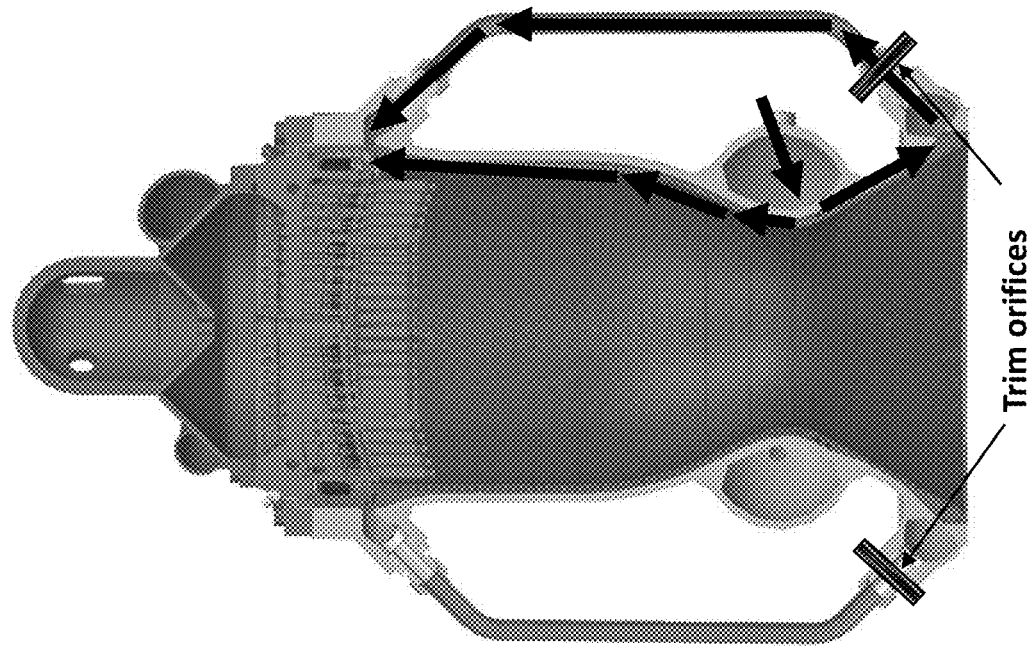
FIGS. 6a to 6c provide cross-sections of a thrust chamber showing fuel flow in accordance with aspects of the disclosure.
Figures 6B, 6C:
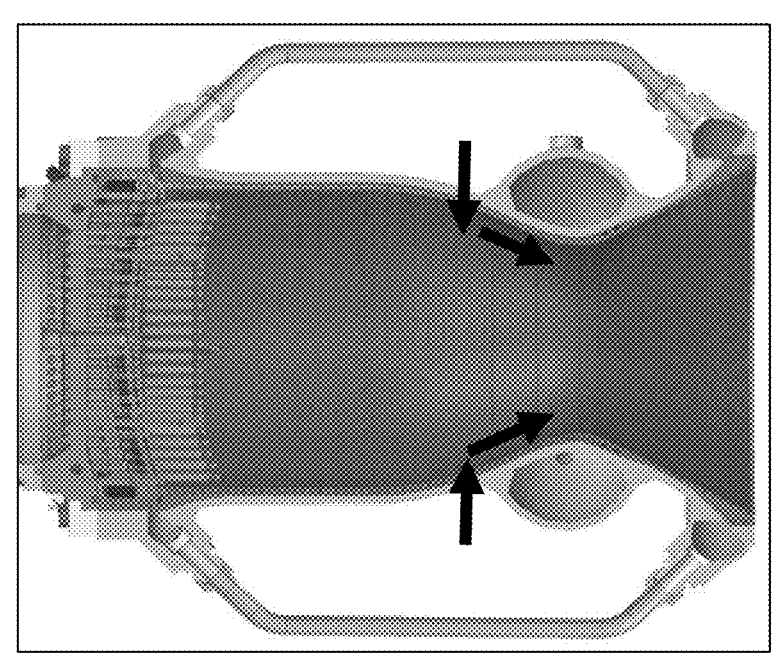

In the aspect of the regenerative system shown in FIG. 5b, the regenerative cooling fuel flow (2) from the main valve (308) is split as it enters the fuel inlet manifold (310), which is positioned at the throat (312) of the thrust chamber assembly (300) such that a upper pass portion (3) is directed up the wall of the combustion chamber (302) directly to the injector assembly (312) and a second lower pass portion (4) is directed aft, away from the combustion chamber, through the wall of the upper nozzle skirt (314) and via the aft return manifold (316) and return lines (318) into the forward return manifold (320) and from there into the injector assembly (312). In an arrangement, as shown in FIG. 6a, portions of the fuel flow are directed through the upper and lower passes depending on the design and thrust requirements of the engine. However, it will be understood that aspects of the disclosure are directed to any thrust chamber assembly comprising a regenerative cooling system. For example, as shown in FIG. 6b, in various aspects a single pass regenerative cooling arrangement in which the fuel flow (350) enters the fuel inlet manifold (352) at the bottom of the upper nozzle skirt (354) and all of the fuel flow (5) passes up the wall of the thrust chamber assembly to the injector assembly (356). In yet another arrangement, as shown in FIG. 6c, a regenerative cooling scheme may include a main combustion chamber film cooling system whereby a portion of the fuel flow is directly injected into the combustion chamber (358) itself upstream of the throat (360) of the combustion chamber, which can decrease heat flux and in turn thermal strain significantly but at the cost of thrust capacity. Other examples of regenerative cooling arrangements are known within the art and are fully contemplated according to aspects of the disclosure.

While there are many possible regenerative cooling arrangements (some of which are described above) the considerations in designing those arrangements and the thermal and mechanical properties are universally demanding. For example, the heat flux through the chamber wall is very high, and the amount of heat that can flow into the coolant is controlled by many factors including the temperature difference between the chamber and the coolant, the heat transfer coefficient, the thermal conductivity of the chamber wall, the velocity of the fluid inside the coolant channels, the velocity of the gas flow in the chamber/nozzle as well as the heat capacity and incoming temperature of the fluid used as a coolant. Moreover, with regenerative cooling, the pressure in the cooling channels is greater than the chamber pressure. The inner liner is under compression, while the outer wall of the engine is under significant hoop stresses. The metal of the inner liner can be greatly weakened by the high temperature, and also undergoes significant thermal expansion at the inner surface while the cold-side wall of the liner constrains the expansion. This sets up significant thermal stresses that can cause failure.

To address all of these competing demands the inner liner is usually constructed of relatively high temperature, high thermal conductivity materials; traditionally copper or nickel based alloys have been used. In addition, different manufacturing techniques have been used to create the complex geometry necessary for regenerative cooling, including for example, corrugated metal sheet brazing between the inner and outer liner; the manufactures and assembly of an array of pipes brazed into the correct shape, or an inner liner with milled cooling channels and an outer liner surrounding. In each case the consideration is in carefully controlling the balance and flow of the regenerative cooling fluid through the cooling liner. In turn this requires control over features (e.g., inlet size, channel wall roughness, wall contour, wall thickness, etc.) that are in the millimeter or even submillimeter range.

As discussed above with reference to FIG. 2, there are a number of techniques that could be used to form this intricate liner structure using additive manufacturing. Specifically, as shown in the chart additive manufacturing techniques capable of forming parts having centimeter to meter sizes but with features in the millimeter range exist including, for example, PBF and EB-PBF. However, these materials and these processes are unable to reach the tens of meters needed to form the overall thrust chamber assembly in an efficient manner. Moreover, these copper alloys typically don't have the strength characteristics necessary for the mechanical strains placed on the thermal combustion chamber or overall rocket engine. Accordingly, even where regenerative liners are formed via additive manufacturing they are typically brazed or welded into a preformed combustion chamber, which is then separately provided with manifolds and supporting elements during assembly. This is because a single conventional additive technique does not support high thrust thermal combustion assembly needs, namely large print volume, small features, multiple materials (e.g., specialized thermal alloys & high strength alloys).

Figure 7:
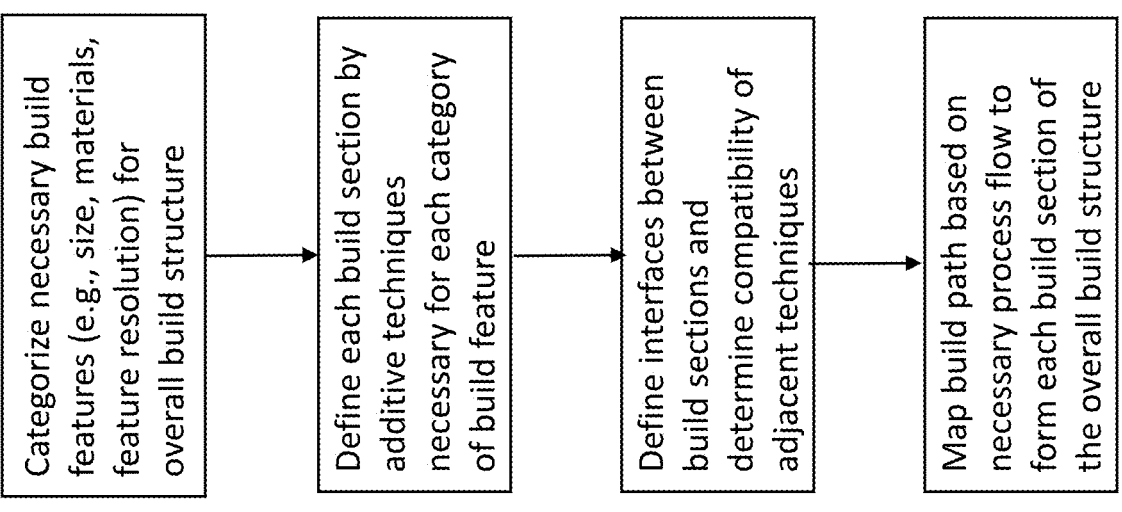
FIG. 7 provides a flow-chart of a hybrid additive manufacturing process in accordance with aspects of the disclosure.

Hybrid additive techniques according to aspects of the disclosure open up space for a solution to this barrier to fully additively manufactured thermal combustion assemblies. In various aspects hybrid manufacturing refers to methods of combining disparate additive manufacturing techniques to form a single manufactured object to address variant manufacturing requirements (e.g., part size, feature resolution, material selection, build speed, wall thickness, etc.) of that object. FIG. 7, provides a generic flowchart of an exemplary hybrid additive manufacturing process. According to aspects of the process different additive interfaces are created to allow for a complete additive build on a manufactured item having variant requirements. In various aspects an item to be manufactured is first divided into build segments based on requirements for the item. Adjacent segments having requirement variants that are incompatible (e.g., a material, size, feature resolution, build speed, wall thickness, etc.) with a single additive manufacturing technique are determined and an interface defined between them. A suitable additive manufacturing technique capable of addressing these new requirements and compatible with underlying additive manufacturing technique is then introduced along the build path. This process is then repeated for each build segment and interface until the whole part is constructed. It will be understood that any additive manufacturing techniques may be used in conjunction with each other provided a suitable interface can be formed.

Figure 8:
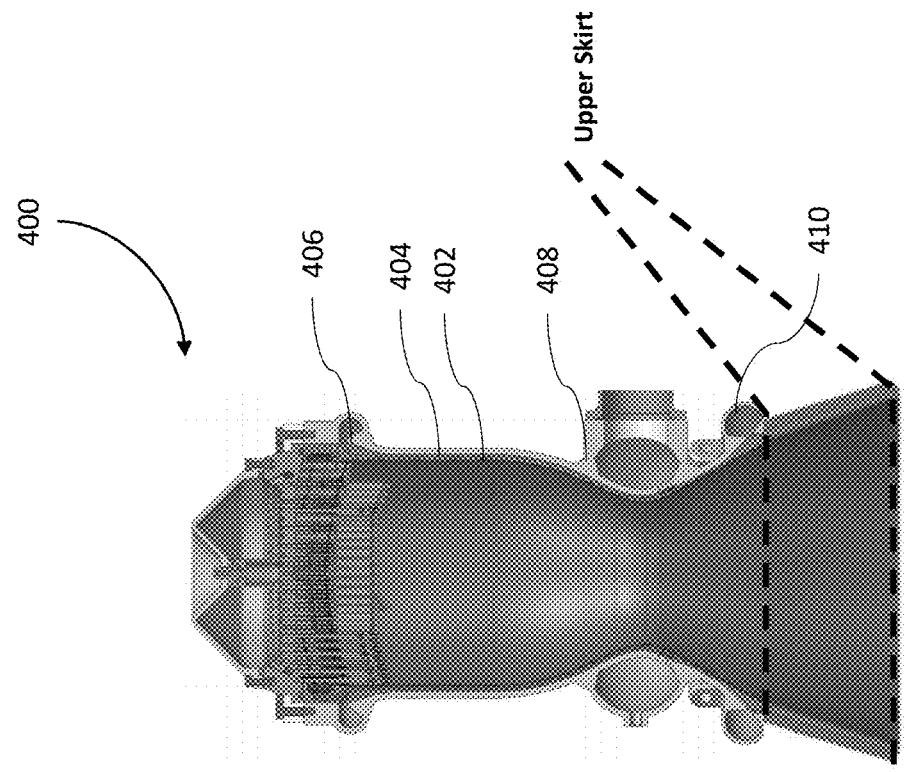
FIG. 8 provides a cross-section of a thrust chamber in accordance with aspects of the disclosure.

In aspects hybrid additive manufacturing processes are adapted to manufacture a thermal combustion assembly. As previously discussed, thermal combustion chambers are complex machines having a number of functional elements that conventionally require the manufacture and assembly of a variety of different components (see, e.g., FIG. 3a). However, aspects of the disclosure contemplate single piece thermal combustion chambers manufactured using a hybrid additive process. An exemplary additively manufactured thermal combustion chamber according to aspects of the disclosure is shown schematically in FIG. 8.

As previously discussed, forming a thermal combustion chamber (400) is not possible using a single conventional additive manufacturing process for several reasons, namely, 1) the different materials required between the regeneratively-cooled liner (402) that forms the inner surface of the thermal combustion chamber and the materials used to form the outer cladding/jacket (404) and manifold structures (406, 408, 410); 2) the mismatch between the overall size of the thermal combustion chamber and the feature resolution of internal elements of the chamber such as cooling inlets or inner fluid manifold surfaces; and 3) finally the speed required to print the overall object on an industrial scale, among others. In accordance with aspects of the hybrid additive process, the thermal combustion chamber can be divided into three distinct build segments: 1) the inner regeneratively-cooled liner, which requires the manufacture of a number of precise channels with feature sizes in the millimeter to sub-millimeter range; 2) an outer cladding/jacket that requires the depositions of relatively thick layers of materials over a large area; and 3) a series of fluid manifolds interconnecting the inner-regeneratively-cooled liner to the other elements of the rocket engine and that combine both a need to have thick outer walls, controlled inner surfaces, and complex boss interfaces formed as connection points to those external elements. In addition, in various aspects the thermal combustion chamber may be further integrated with a nozzle skirt, which has additional variant requirements discussed below.

In accordance with aspects of the hybrid additive manufacturing process previously described with reference to FIG. 7, using these build segments it is possible to configure a print path that allows for the incorporation of multiple additive manufacturing processes in a series with transitions designed along the interfaces of the various build segments. For example, in the aspect provided in FIG. 8, the inner regeneratively-cooled liner may be formed using a higher resolution process, such as, for example PBF or eBeam and a suitable thermally conductive material (e.g., a Cu-based alloy), while the outer cladding/jacket surfaces may use a lower resolution but higher output process such as WAAM or Cold Spray, and the manifolds may be formed using a intermediate process capable of forming smaller elements with thicker walls and medium resolution features such as PBF or WAAM with higher strength materials (e.g., Ni—Cr-based alloy). Once the interfaces are determined the print path can be defined both with changes in additive process and material to thereby create an overall hybrid print process flow program for the thermal combustion chamber.

An exemplary aspect of such a hybrid additive process is shown schematically in FIG. 9a. In various aspects the hybrid additive process may be divided into different print segments (A to F) based on the transition between print and process modes. In the exemplary process provided in FIG. 9a, the process starts with a lower volume, but higher resolution process, such as PBF or DED (FIG. 9a, Step A), for forming the fully integral regeneratively-cooled liner element (450) of the thermal combustion chamber (440) including all internal regenerative cooling channels and inlets and outlets having small feature size requirements (e.g., ~≤1.0 mm) using a high thermally conductive material (e.g., a copper-chromium-niobium alloy of the class GRCop). After the formation of the regeneratively-cooled liner element the process transitions (FIG. 9a, Step B) to selectively cladding the liner with one or more layers (452) of a high strength material (e.g., Ni-based alloys such as Inconel®) using a high volume lower resolution process such as, for example, WAAM or cold spray to provide additional structural integrity to the overall thermal combustion chamber. A further transition (FIG. 9a, Step C) can be made at this point to form appropriate channel inlet holes (458) at the clad locations (452) of the fluid manifolds to provide access to the internal channels of the regeneratively-cooled liner element (450) that may have been covered in the previous step. This segment of the overall manufacturing path requires a process capable of producing high fidelity elements (~<1 mm) as the fluid flow into and out of the regeneratively-cooled liner element is dependent on the shape and conformation of these inlets. Exemplary processes include, for example, an electric discharge machining (EDM). Once the inlets to the regeneratively-cooled liner element are formed a partial manifold enclosure may be deposited around the inlet channel using a suitable high volume and mid resolution process, such as, for example, WAAM, cold spray or DED, as will be described in greater detail below in a further segment of the hybrid process (FIG. 9a, Step D). In a subsequent transition, inlet flange bosses (464) and port bosses (466) may be formed in a further segment (FIG. 9a, Step E) of the hybrid process using a mid-scale and resolution process, such as, for example, WAAM or DED. The manifold and boss elements may use the same (e.g., Ni-based alloys such as Inconel®) or a different material from the overall cladding material depending on the specific mechanical and thermal requirements. Images of an exemplary thrust chamber formed in accordance with such aspects is provided in FIG. 9b.

The above discussion has focused on only additive manufacturing steps, it will be understood that other processing steps may be included in hybrid additive manufacturing techniques as necessary to generate acceptable parts. For example, as shown in FIG. 9a (Steps A and F), various aspects may include heat treatment or annealing processes to age-harden or otherwise proof materials. For example, corrosion resistant alloys and/or high-temperature alloys often require annealing too high temperatures in either normal or special atmospheres to achieve suitable physical properties. The number duration and conditions of such annealing steps will be understood to depend on the specific materials chosen for the process. Similarly, PBF techniques often require depowdering (e.g., via ultrasonic rotating table or other technique) to remove contaminants prior to further processing (FIG. 9a, Step A). As also shown in FIG. 9a (Step F), proofing, cleaning and testing steps may also be incorporated into aspects of hybrid additive manufacturing techniques as necessary for the specific application. Finally, for most additive manufacturing process removal from the build plate and machining of interfaces will also be necessary according to methods that will be understood within the art (see FIG. 9a, Step F).

While the above discussion, and related figure, demonstrates the hybrid additive manufacturing process using specific combinations of processes and transitions between processes, it should be understood that aspects of hybrid additive manufacturing according to the disclosure are generally applicable and may be combined and rearranged as necessary for the application and design of the specific complex object being formed. Steps, for example, may be rearranged, repeated, substituted, or combined as necessary. Moreover, any combination of high and low resolution and/or high and low volume and/or material specific processes may be used provided a suitable transition may be made between them in accordance with the restrictions described, including for example, CS, DED, WAAM or DED-arc, material extrusion, PBF, DMLM, DMLS, EBM, SLS SHS, LOM and UAM. Similarly, as will be discussed in greater detail later any suitable combination of materials may be used provided they can be materially combined together without creating unacceptable material boundaries or interactions.

Figure 10A:
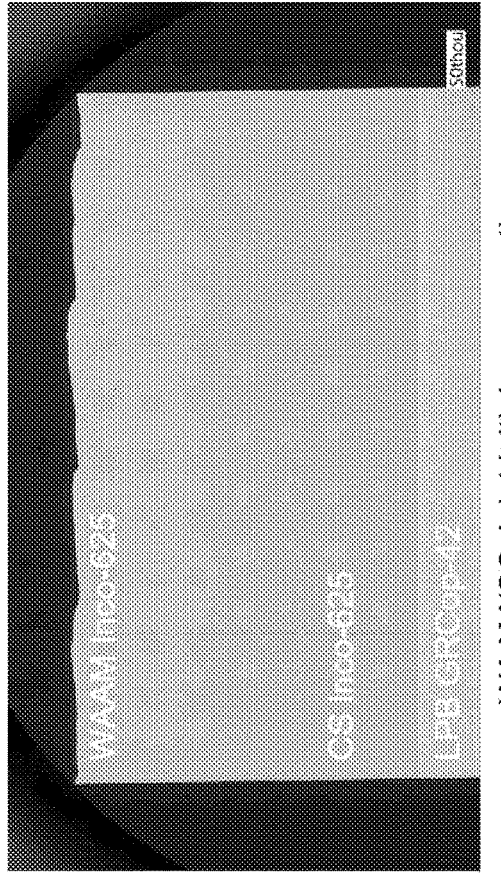
FIG. 10a provides a cross-section of a layered piece formed using a hybrid additive manufacturing process in accordance with aspects of the disclosure.
Figure 10B:
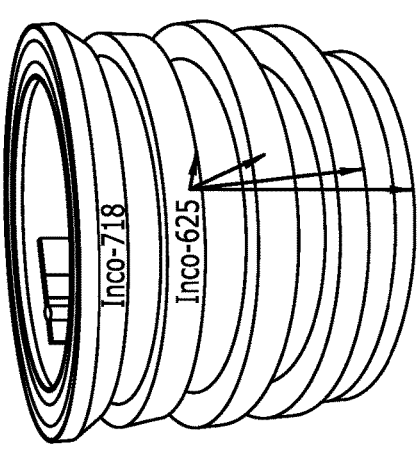
FIG. 10b provides an image of a piece formed using a hybrid additive manufacturing process in accordance with aspects of the disclosure.
Figure 11C:
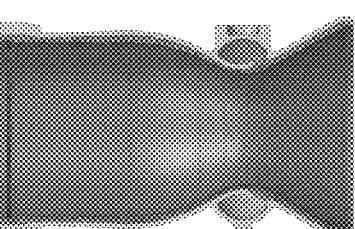
FIGS. 11a to 11e provide cross-sections of thrust chambers in accordance with aspects of the disclosure.
Figure 11E:
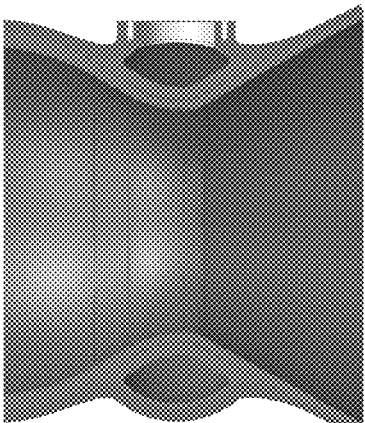
Figure 11B:
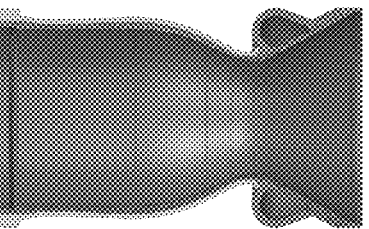
Figure 11D:
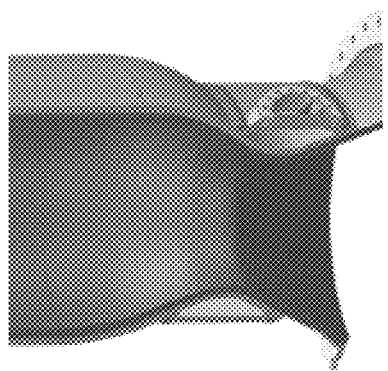
Figure 11A:
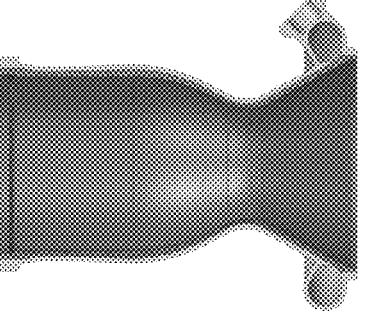

It will be understood that aspects of the disclosure are also related to hybrid additive process capable of being combined using the same or different materials without compromising the physical or material integrity of the overall part. For example, as shown in FIG. 10a, a part formed in accordance with aspects of a hybrid additive manufacturing process may be formed of one or more materials deposited with one or more techniques (e.g., WAAM deposited Inco-625 atop CS deposited Inco-625 atop PBF deposited GRCop-42), or as shown in FIG. 10b WAAM deposited Inco-718 atop WAAM deposited Inco-625. A grid of possible material combinations tested in accordance with aspects of the disclosure is provided in FIG. 10c, however, it should be understood that this set of material combinations is exemplary, and only provided to demonstrate that one skilled in the art will be able to select from a wide range of combinable materials using the hybrid additive processes described herein.

Moreover, while the above discussion has focused on a hybrid process pathway for a thermal combustion chamber having a specific designed and geometry, it will be understood that the steps of the process may be rearranged, repeated, substituted, or combined as necessary in accordance with aspects of the disclosure to form a wide-variety of thermal combustion chamber designs having different overall form factors, inner regenerative liner configurations, manifolds, manifold placements, boss and port arrangements, etc. A few exemplary variations are provided in FIGS. 11a to 11e, showing variations in manifold placement, cladding profile, and regeneratively-cooled liner element design. It will be understood from FIG. 7 that aspects of the hybrid additive manufacturing process described in FIG. 9a, and provided in greater detail in the figures below, may be combined and rearranged to form these and many other thermal combustion chamber designs and components.

While the above discussion has focused generally on processes and features for forming an overall thermal combustion chamber, it will be understood that various aspects of the disclosure are directed to processes directed to the formation of novel integrated structures across various structural layers of a thermal combustion chamber. Various aspects will be described in the sections below, however, it will be understood that each and every process technique and structure described in the sections below is intended as an aspect of the overall hybrid additive manufacturing process previously described with respect to FIGS. 1 to 11e, above.

Regenerative Liner Aspects

Aspects of thermal combustion chambers incorporate an inner structure comprising a regeneratively-cooled liner that defines the internal volume of the thermal combustion chamber including combustion chamber, throat and nozzle, and provides regenerative cooling to the thermal combustion chamber such that combustion and thrust can be generated and the structural integrity of the overall chamber preserved. Accordingly, various aspects of the disclosure are directed to additively manufactured regeneratively-cooled liners for thermal combustion chambers (FIG. 9a, Step A). As previously discussed, the challenge in additively manufacturing such elements of a thermal combustion chamber is the combination of a fairly high print volume with the need for high resolution features. In particular, as shown in FIG. 12, and elsewhere, the regeneratively-cooled liner (470) is an internal element of an overall thermal combustion chamber (472) having a set of internal channels (474) that provide a plurality of fluid pathways for incoming fuel to travel through the body of the thermal combustion chamber prior to reaching the injector assembly (476). While many configurations of regeneratively-cooled liners have been described, it will be understood that the cooling efficiency of all designs of liners depend on the efficiency of this fuel flow into and around the various regions of the thermal combustion chamber.

Figures 12A, 12B, 12C:
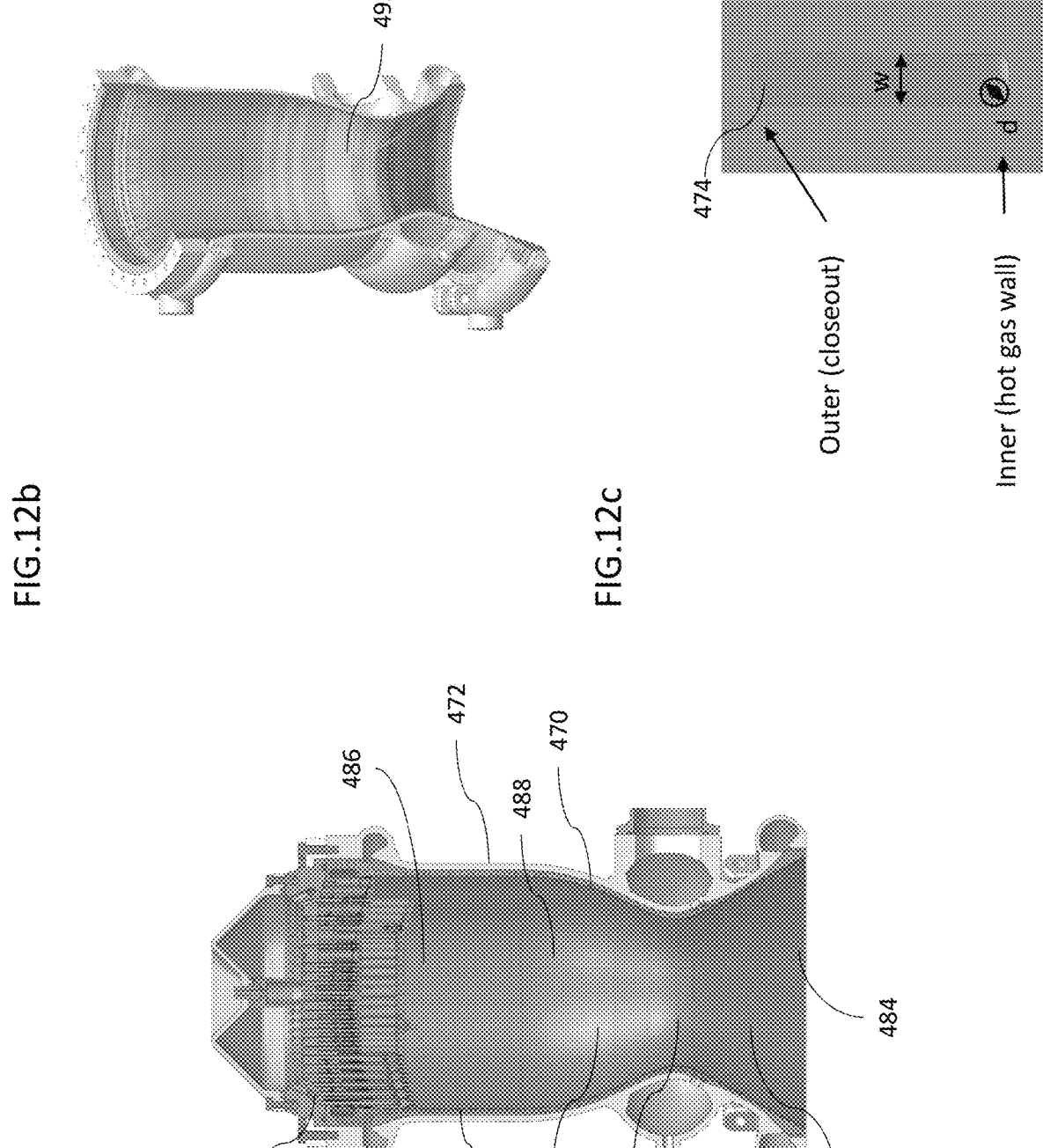
FIGS. 12a to 12c provide cross-sections of thrust chamber flow channels in accordance with aspects of the disclosure.

According to aspects, regeneratively-cooled liners may be defined by the overall configuration of the body of the liner, the cooling channel geometries within the liner, and the arrangement and geometries of the various inlets and outlets for the cooling channels. For example, in some aspects, as shown in FIG. 12a, the inlets and outlets may be positioned in various locations along the body of the liner. For example, inlets into the internal channels of the cooling liner may be disposed in the throat region (478) of the liner either on the converging (480) or diverging (482) portions. Other inlets and outlets to and from the internal channels of the cooling liner (e.g., for split-flow designs) may be disposed at the base region (484) and/or top region (486). In other aspects outlets may be disposed into the internal volume (488) of the combustion chamber to enable film cooling, for example upstream of the throat region at the converging region (480) of the thermal combustion chamber. The position of these inlets and outlets to and from the inner cooling channels of the thermal combustion chamber are determined by the overall design and performance parameters of the thermal combustion chamber and may be included in the initial print of the regeneratively-cooled liner. The channels may also be formed integrally to take any flow path configuration, such as for example, straight, serpentine, or even spiraled across the body and length of the thermal combustion chamber, as shown by the overlaid line (492) in FIG. 12b.

Figure 13:
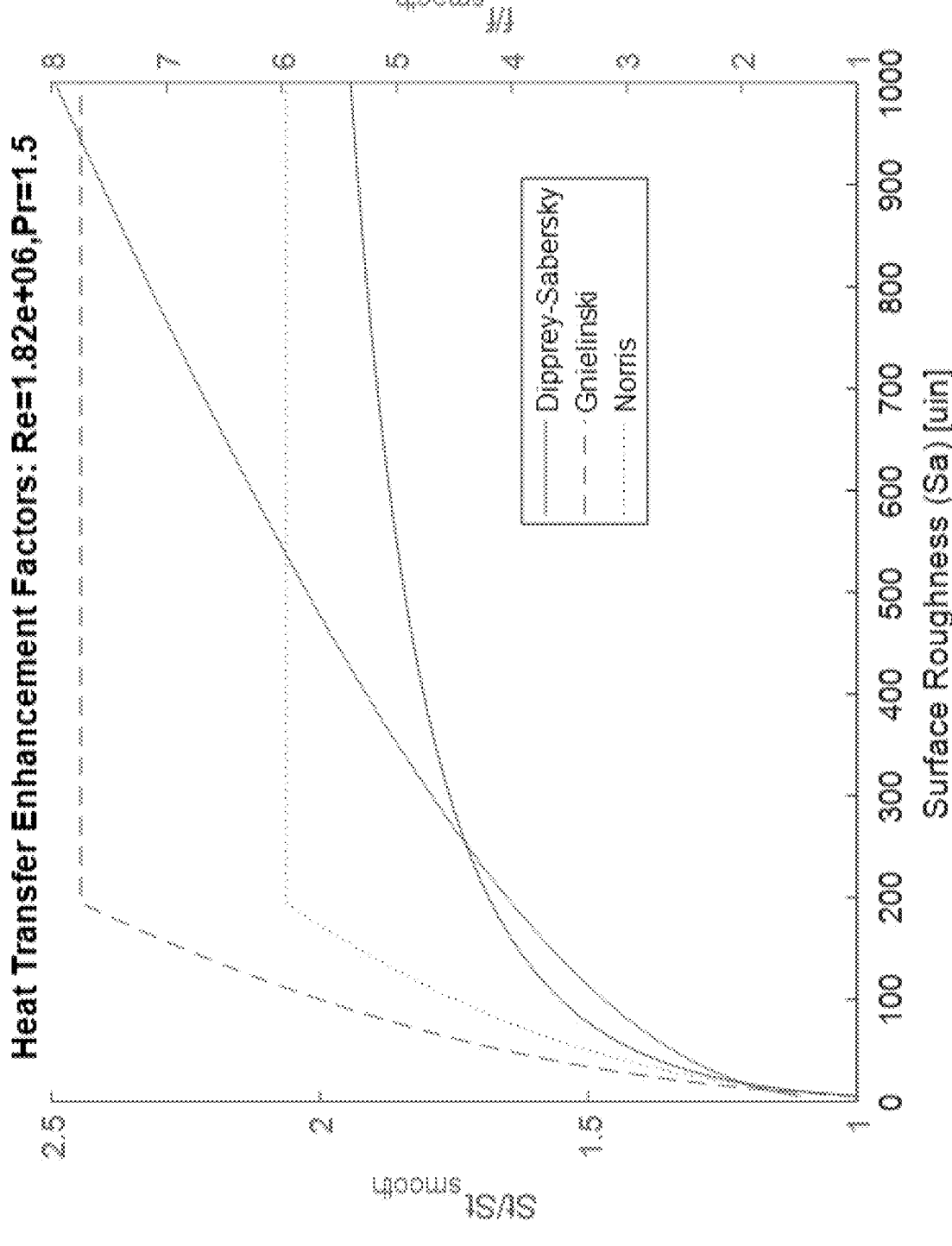
FIG. 13 provides a plot of heat transfer efficiency against surface roughness in accordance with aspects of the disclosure.

Regardless of the specific design of the regeneratively-cooled liner and the placement and configuration of the inlets and outlets, the cooling efficiency of the liner element is significantly dependent on the geometry and flow properties of the cooling channels and inlets and outlets. Accordingly, aspects are directed to additive manufacturing processes capable of controllably reproducing the feature resolution necessary within these cooling channels. More specifically, additive manufacturing processes capable of producing a high density of cooling channels, having high channel dimensional tolerances, high geometry tolerances, and high tolerance surface roughness is required. More specifically, a typical liner element may have hundreds of individual channels, and these channels may be defined by the ratio of channel width to corner radius (as schematically shown in FIG. 12c). These dimensions must be balanced to the tenths or hundredths of inches to ensure optimal cooling efficiency. (See, e.g., Atefi, et al., *AIAA Propulsion and Energy* 2021 *Forum*, pg. 3579, 2021, the disclosure of which is incorporated herein by reference.) Similarly, as shown in the graph provided in FIG. 13, the heat transfer efficiency is also dependent on the surface roughness of the channels. In various aspects, for example, above a roughness of ~200 Sa uin the heat transfer efficiency increase is not sufficient to overcome the build-up of pressure in the channels and the overall heat transfer efficiency of the liner element decreases. Accordingly, the inventors recognized that an additive manufacturing process capable of printing a feature resolution in a submillimeter resolution is necessary to ensure these features are reproduced with sufficient accuracy. In various aspects a PBF, eBeam, or BJT process may be used, either alone or where necessary, in combination with one or more post-processing techniques, such as, for example, chemical etching or chemical/mechanical polishing.

As previously described, the liner element may be formed of any suitable high thermally conductive alloy, including for example, Cu-based alloys such as those in the GrCop family (e.g., GrCOP-42) or C181850 that are compatible with other structural materials used across the hybrid additive manufacturing process of the disclosure. Although exemplary materials are described herein, it will be understood that other printable and high temperature conducting alloys may also be used as will be understood by those skilled in the art.

Manifold Aspects

As discussed aspects of thermal combustion chambers incorporate an inner structure comprising a regeneratively-cooled liner that defines the internal volume of the thermal combustion chamber including combustion chamber, throat and nozzle, and provides regenerative cooling to the thermal combustion chamber such that combustion and thrust can be generated and the structural integrity of the overall chamber preserved. As previously discussed, conventional thermal combustion chambers include a combustion chamber element that is combined with other elements, such as injector assemblies, fluid manifolds, component ports and brackets etc. via conventional assembly means, such as, for example, welding, brazing, bolting, etc. Various aspects of the disclosure are directed to fluid manifolds for thermal combustion chambers integrally additively manufactured in conjunction with regeneratively-cooled liner elements. According to aspects, manifolds (FIG. 9a, Steps C/D) and claddings (FIG. 9a, Step B) may be formed integrally onto an underlying regeneratively-cooled liner element to form a fully integral thermal combustion chamber.

Figures 14A, 14B, 14C, 14D:
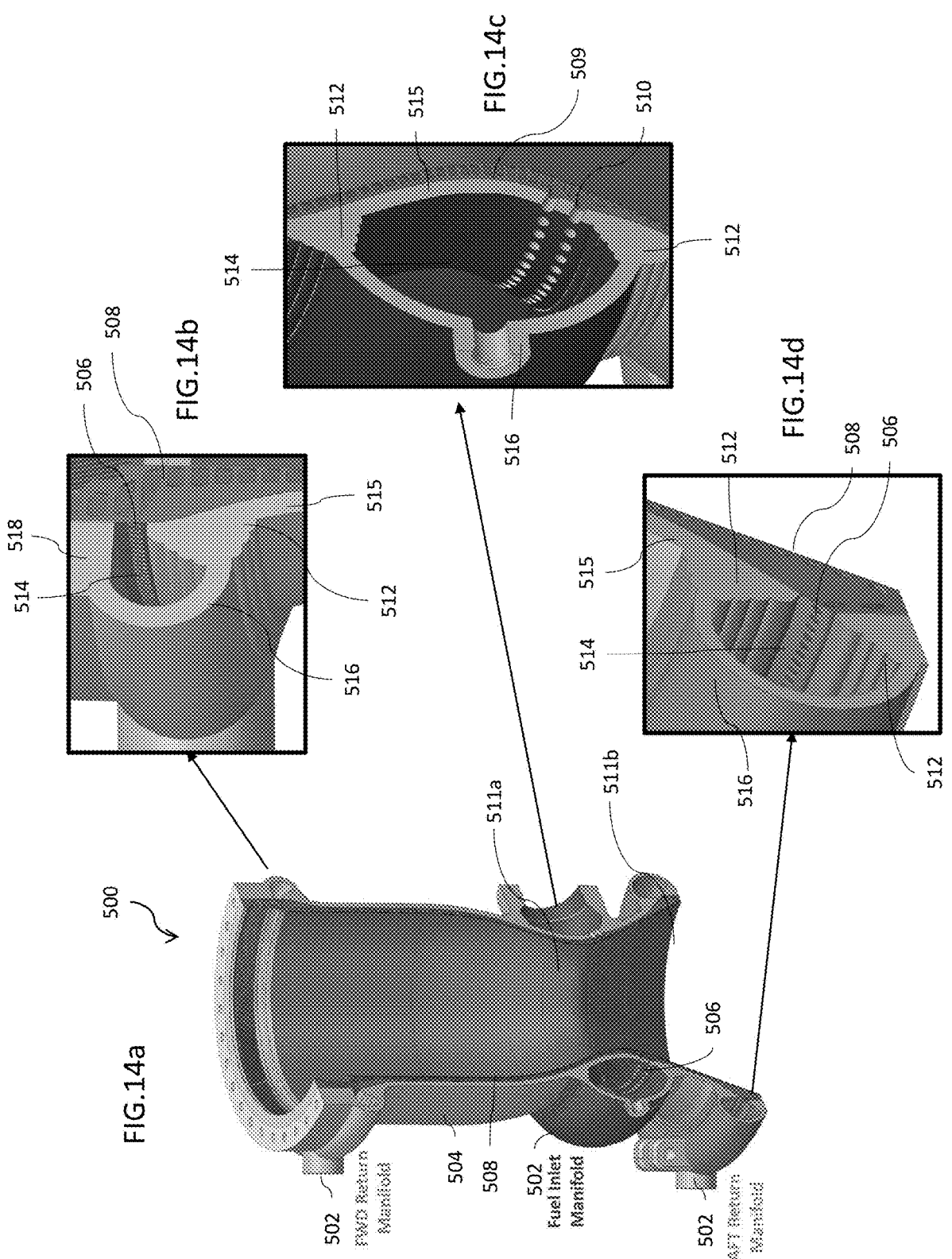
FIGS. 14a to 14e provide cross sections of thrust chambers with integral fluid manifolds in accordance with aspects of the disclosure.
Figure 14E:
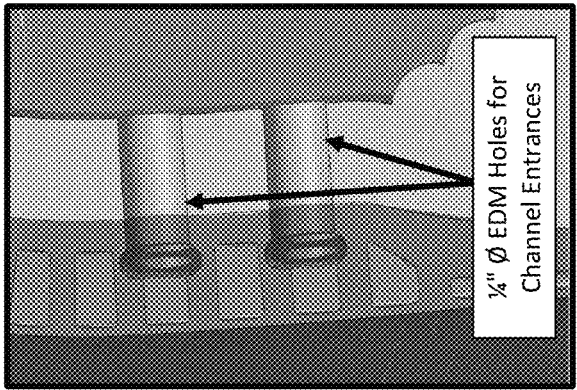

An aspect of a thermal combustion chamber incorporating integral cladding and fluid manifolds is depicted schematically in FIG. 14a. As shown, in aspects of a thermal combustion chamber (500) integral fluid manifolds (502) are formed over and in conjunction with integral structural cladding layers (504). These fluid manifolds are disposed in regions of the thermal combustion chamber where inlets or outlets (506) to the inner cooling channels (508) are collocated to provide fluid flow between the various regions of the regeneratively-cooled liner element, the thrust skirt (not shown) and the injector assembly (not shown). These regions may be directly accessible to inlet/outlet holes (506) formed during the forming of the regeneratively-cooled liner element (508) (as shown in FIGS. 14*b* and 14*d*), or to areas of the structural cladding layers (509) where inlet/outlet holes (510) have been formed (e.g. via EDM) through cladding layers (FIG. 14*e*) to form conduits to inlet/outlet holes in the regeneratively-cooled liner element (as shown in FIG. 14*c*). Specifically, FIG. 14*c* provides a detail view of the primary fuel inlet manifold where fuel is first introduced into the thermal combustion chamber. Likewise, FIG. 14*d* provides a detailed view of the aft return manifold, which takes fuel flowing down from the throat (511*a*) to the aft region (511*b*) of the thermal combustion chamber (500) and directs it through a series of return lines (not shown) to the forward return manifold (shown in detail in FIG. 14*b*), which in turn directs the fuel through inlets/outlets, to the injector assembly.

One skilled in the art of fluid dynamics will appreciate that sharp edges and angles can lead to areas of high stress when a vessel is placed under pressure. Accordingly, minimization of angles (e.g., acute, right, reflect, etc.) forming sharp corners and edges is important in these fluid channels because during operation they are placed under immense pressures (e.g., on the order of 4000 to 5000 psia). Traditionally, this is accomplished by forming separate fully cylindrical fluid vessels that are then interconnected with the thermal combustion chamber. As shown in the cross sections provided in FIGS. 14*a* to 14*d*, in various aspects the integral fluid manifolds of the disclosure are formed of a series of sections that overall form a semi-cylindrical cross-section omitting angles that might create edges and corners where excess pressure can build within the fluid channel. To accomplish this aspects are formed of a pair of tapered base layers (512) aligned across from each other atop a region (514) of the cladding layer (515) wherein a set of inlet/outlets to the regeneratively-cooled liner element are disposed, and an upper curved wall (516) formed atop these base layers and enclosing the area around the inlet/outlet region.

According to various aspects the base layers (512) may be formed of a plurality of tapered overlapping printed layers. While specific designs of base layers are provided in the diagrams, the number of layers and disposition of the layers is dependent on the specific geometry of the base layer being formed. For example, as shown in greater detail in FIGS. 14*b* to 14*d*, tapered base layers and cylindrical walls may take many forms depending on the specific geometry of the underlying region of the outer thermal combustion chamber being enclosed and the nature of the fluid manifold being formed. For example, the fluid manifolds of FIGS. 14*c* and 14*d* have stepped base layers (512) aligned on both sides of the inlet/outlet region (514) being enclosed by the fluid manifold, by contrast FIG. 14*b* interconnects a stepped base layer (512) on one side of the inlet/outlet region (514) with the upper port lip (518) of the thermal combustion chamber. Likewise, while the fluid manifold of FIG. 14*d* has base layers (512) that are generally symmetrically aligned across the inlet/outlet region, FIGS. 14*a* and 14*c* show significant asymmetry. Regardless of the specific design and geometry, the combination of the base (512) and upper (516) enclosing walls are configured such that sharp angles/edges and transverse intersections within the fluid channels, and particularly at the junction between the walls of the manifold and the underlying thermal combustion chamber body, are minimized to provide fluid manifolds capable of withstanding high pressures.

While the above discussion has focused on the structure of the manifolds it will be understood that aspects are also directed to processes for forming integral fluid manifolds using hybrid additive manufacturing techniques. In various aspects processes include hybrid additive manufacturing techniques for selectively forming structural cladding layers atop regions of the regeneratively-cooled liner element and then to the formation of integral manifolds by selectively depositing further layers atop the cladding layers to form functional fluid manifolds cooperative with inlets/outlets of the underlying regeneratively-cooled liner element.

Turning first to the structural cladding process, in conventional thermal combustion chambers the regeneratively-cooled liner element (which is typically forged and then fitted with cooling channels) is combined via brazing or welding with a structural outer cladding jacket. However, these processes require many very delicate assembly steps and mean that modifications to any part of either the regeneratively-cooled liner element, the channels, or the cladding jacket requires a concomitant redesign of all other elements of the thermal combustion chamber. Various aspects of the disclosure are directed to hybrid manufacturing processes that allow for the integral formation of cladding layers of high strength materials in conjunction with previously printed regeneratively-cooled liner elements (as described above) using high volume, lower resolution deposition processes, such as, for example, DED, CS or WAAM. As discussed in reference to FIG. 10*c*, aspects of the disclosure are directed to the use of different additive manufacturing techniques in combination with specific combinations of materials. It will be understood that though specific material combinations are described in relation to the formation of cladding layers and fluid manifolds, any suitable combination of materials capable of forming structures of sufficient strength to withstand the thermal strains and pressure loads on the body of the thermal combustion chamber.

According to aspects of the disclosure cladding layers may be selectively deposited using one or more additive manufacturing processes to provide structural support to the underlying regeneratively-cooled liner element that defines the overall inner geometry of the thermal combustion chamber. The structural strength required for each region of the thermal combustion chamber then defines the materials and cladding layer thicknesses required, while the outer conformation of the thermal combustion chamber defines the processing steps required. Specifically, in order to allow for the formation of the integral fluid manifolds it is advantageous to leave the inlets/outlets to the liner element unclad such that fluid manifolds formed atop the liner element are fluidly interconnected therewith. However, to ensure sufficient strength in regions of high strain it is also advantageous to clad around the circumference of the thrust chamber in those high strain regions.

Figure 15:
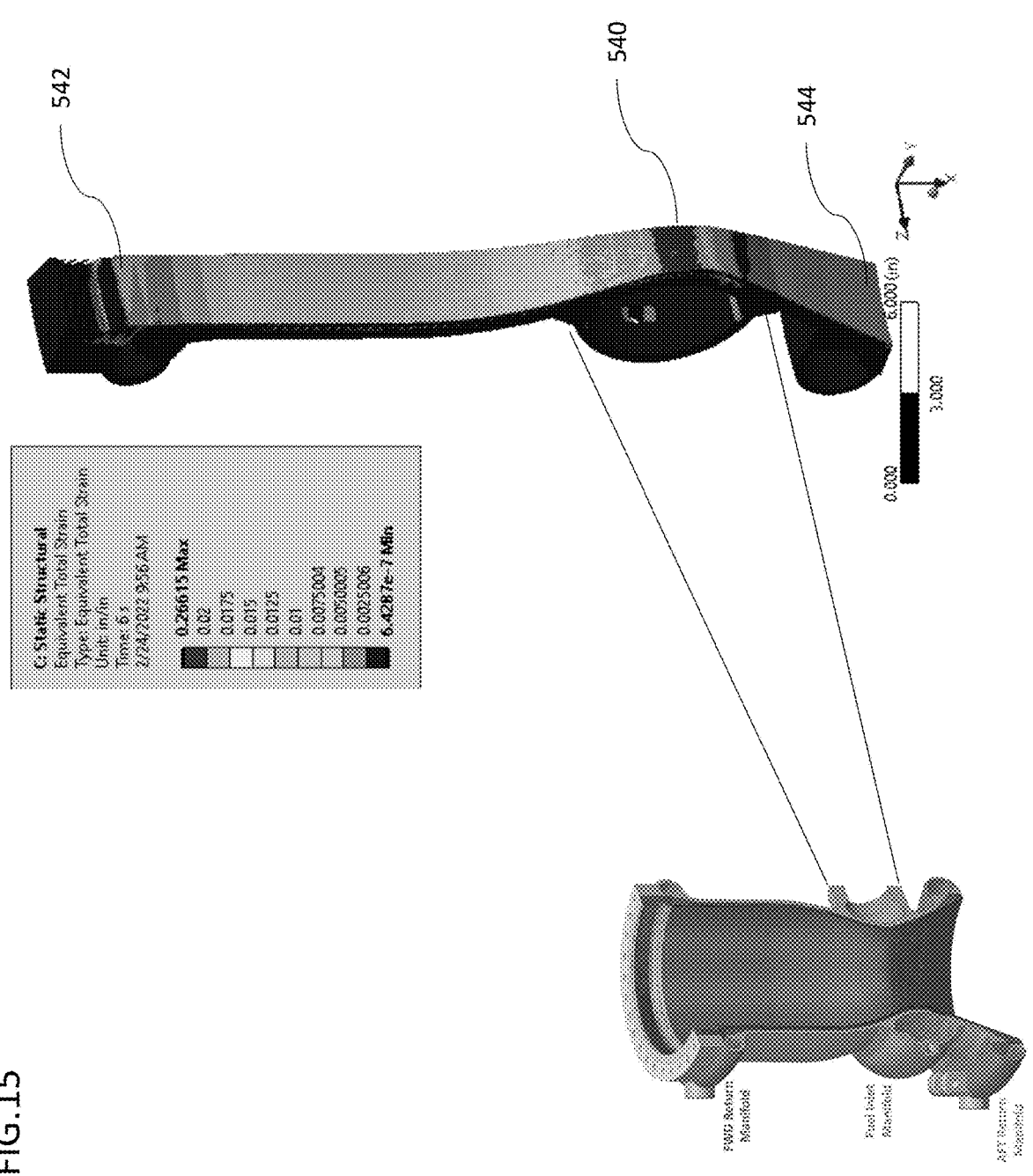
FIG. 15 provides a cross-section of thrust chamber wall strain in accordance with aspects of the disclosure.

In furtherance of determining suitable processes, an analysis was conducted of the total strain along the length of the thermal combustion chamber. A summary of this analysis is provided in FIG. 15 and shows that while stress is high along the length of the combustion chamber it reaches a maximum at the throat region (540) of the thermal combustion chamber. In fact, the total strain is several order of magnitudes higher than the total strain at the forward (542) and aft (544) portions of the thermal combustion chamber. Accordingly, in various aspects the circumferential cladding layers are selectively deposited to provide structural support to the thermal combustion chamber while still allowing for the formation of integrated fluid manifolds fluidly interconnected with the underlying regeneratively-cooled liner element.

Figure 16:
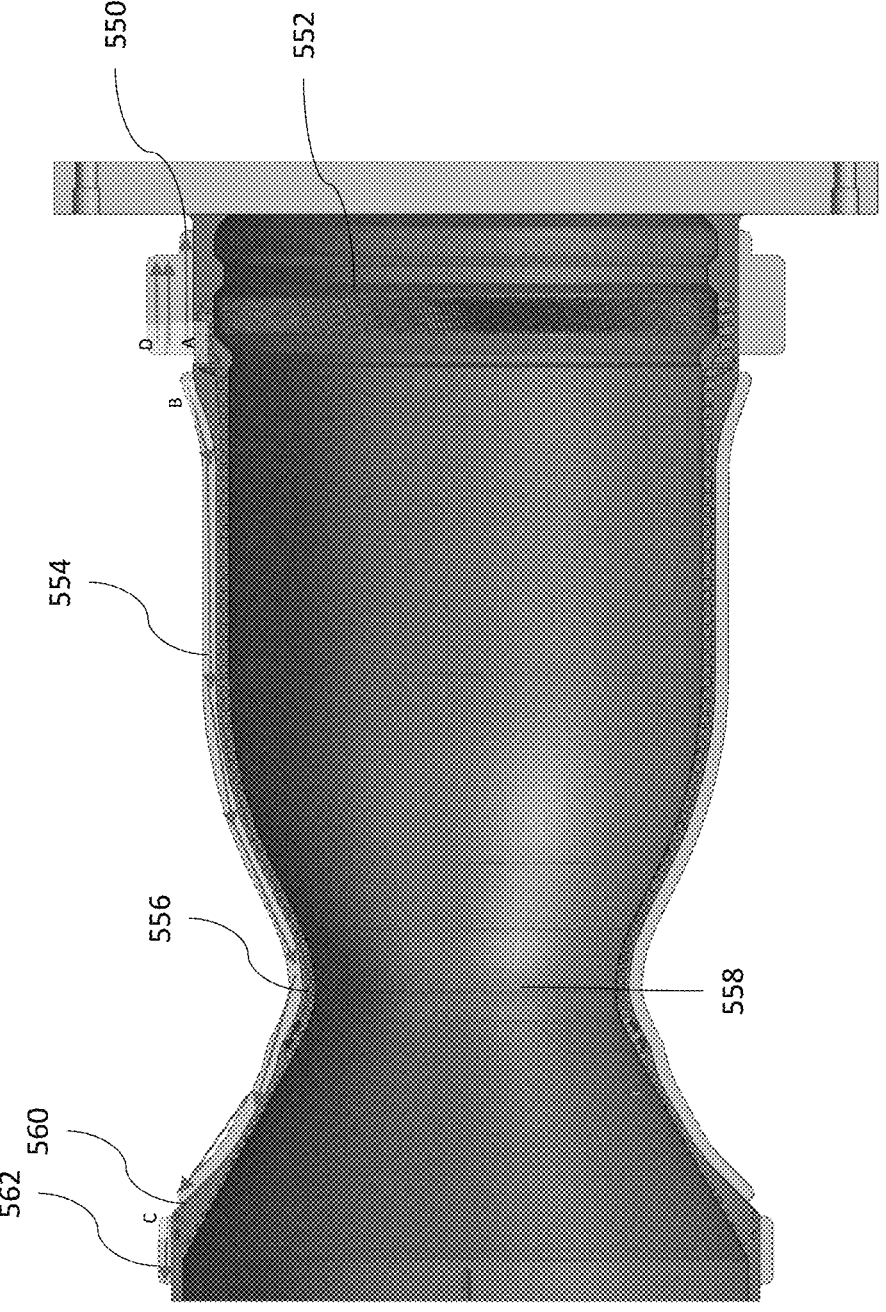
FIG. 16 provides a cross-section of a thrust chamber showing cladding build order in accordance with aspects of the disclosure.
Figure 17B:
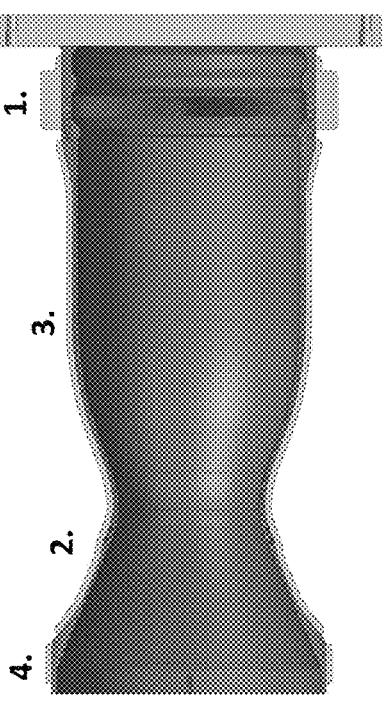
FIGS. 17a to 17d provide cross-sections of a thrust chamber showing build orders in accordance with aspects of the disclosure.
Figure 17A:
Figure 17D:
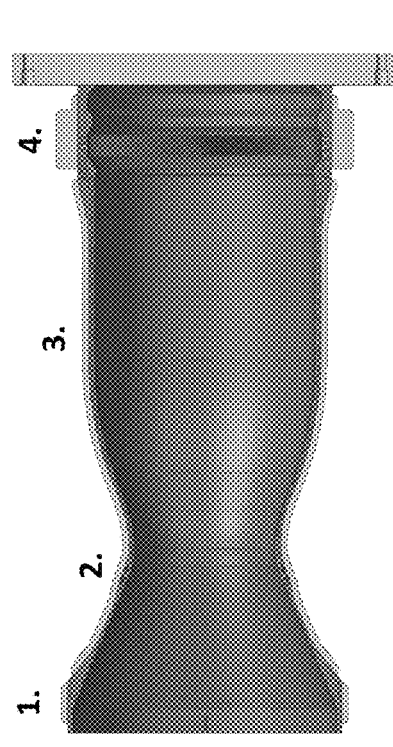
Figure 17C:
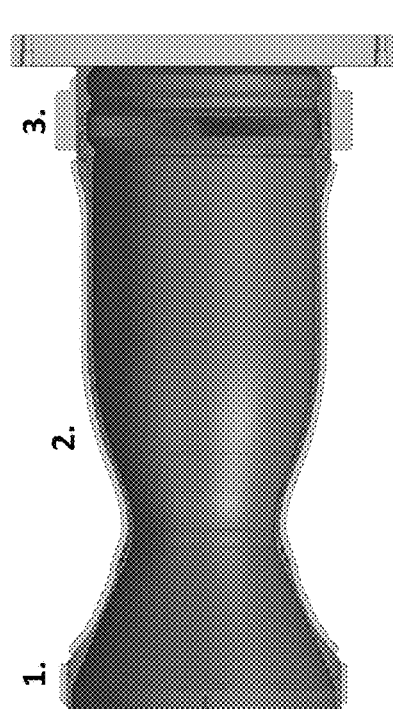
Figure 19:
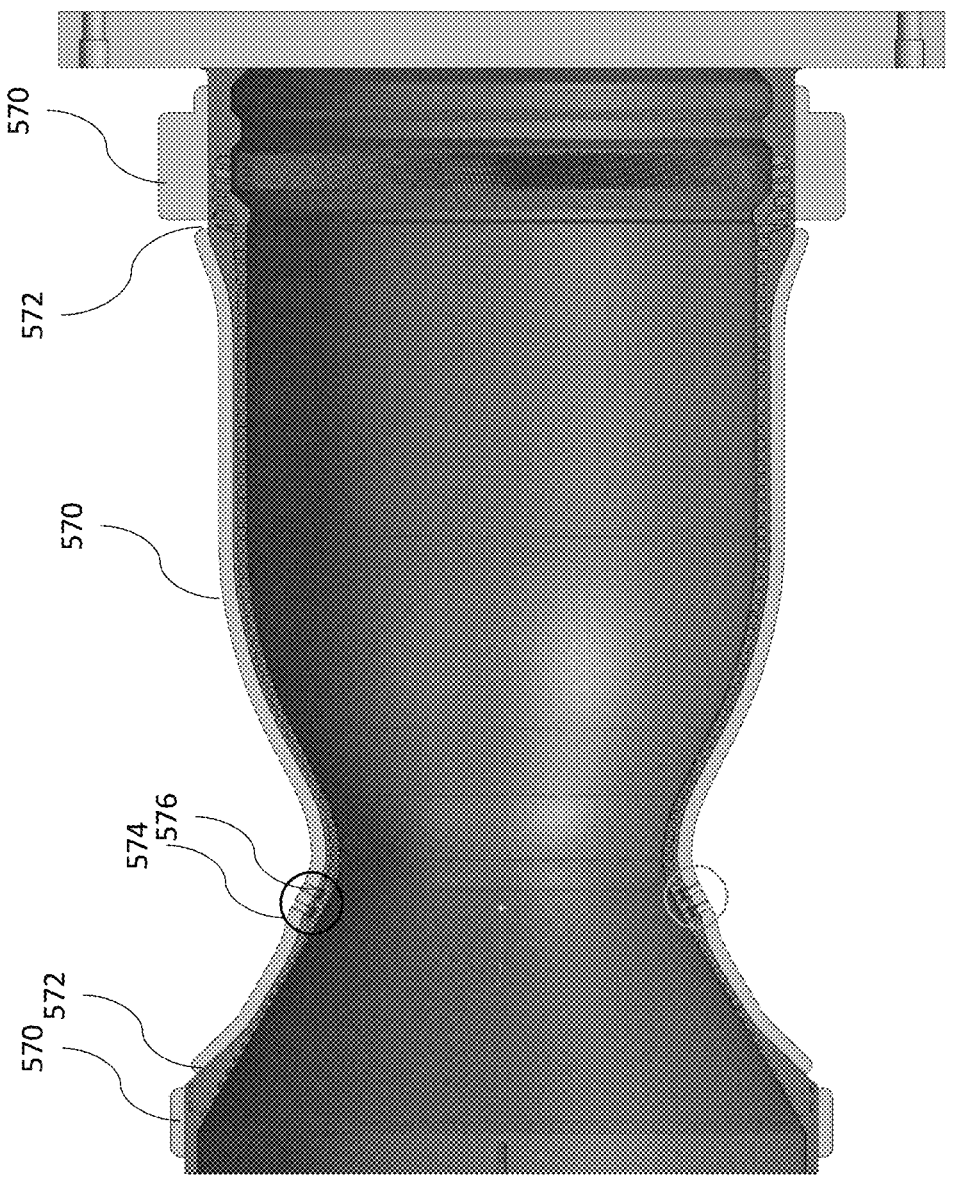
FIG. 19 provides a cross-section of a thrust chamber showing inlet/outlet formation in accordance with aspects of the disclosure.

Specifically, in view of the apparent contradictory requirements for an integral cladding layer, various aspects of the cladding layers are formed strategically such that the cladding layer of the thermal combustion chamber is formed as a series of independent, integrally formed circumferential cladding regions. In addition, the formation of such cladding regions according to some aspects are formed in a specific order to provide the most efficient deposition. For example, in an aspect of the disclosure, shown in FIG. 16, the cladding layers are formed beginning with the top flange (550) printing around the circumference and up toward the upper opening of the thermal combustion chamber (552), as shown by the arrow (A). Then a printed layer (554) is deposited below the region of inlets/outlets (556) that later forms the forward return fluid manifold and overlays the length of the thermal combustion chamber including any inlets/outlets disposed at the throat (558), such that sufficient structural strength is provided to the high strain region of the thermal combustion chamber, and terminates at the region of inlets/outlets (560) that later forms the aft return manifold, as shown by the arrow (B). Another cladding layer is formed at the aft flange (562) on the opposite side of inlets/outlets region (560), as shown by the arrow (C). Finally, the forward and aft flange cladding layers (550/562) may be further built up to a desired height, as shown by arrows (D & E).

While a specific print order according to aspects of the disclosure have been described, it will be understood that other print paths and orders may be incorporated into hybrid additive methods capable of forming integral cladding layers to an underlying thermal combustion chamber regeneratively-cooled liner element. Exemplary alternative print orders are provided in FIGS. 17*a* to 17*d*. As shown, many aspects propose changing the order of the print between the forward and aft inlet/outlet regions, as shown by the sequenced numbers. Although not necessary, such multi-step processes may lead to advantageous print tool geometries, particularly where the angles of the underlying part are steep (e.g., ensuring each print path proceed in an upslope direction).

Regardless of the specific order of the deposition of the layers, the process steps may be repeated as necessary to provide a desired thickness. As shown in FIG. 18, the required thickness of the cladding layer is ultimately determined by the structural strength required, which in turn is determined by the material and deposition process used. For example, in many embodiments a high strength Ni—Cr based alloy (e.g., Inconel-625 or Inconel-718) may be used. However, as summarized in the table, depending on the strength of the material and the process used the thickness required to provide sufficient strength to the thermal combustion chamber may change significantly. It will be understood that aspects of the disclosure contemplate variations in deposition strategy necessary to incorporate a wide-variety of materials and processes depending on the specific requirements of the thermal combustion chamber cladding layers.

Regardless of the specific cladding method used, such processes are chosen to allow for the formation of integral fluid manifolds onto the thermal combustion chamber. As previously described, forming an integral manifold requires that the manifold has access to the underlying outlets/inlets of the regeneratively-cooled liner element. As discussed above and shown in FIG., 19, in various aspects cladding layers (570) are selectively disposed to leave such inlets/outlets (572) uncovered. Where, however, cladding layers are required to provide structural support in outlet/inlet areas (574), aspect include processes capable of providing high precision fluid passages (576) through said cladding layer to the underlying inlet/outlets. A variety of processes may be used to form such fluid passages through cladding layers, including, for example, EDM.

Figure 20:
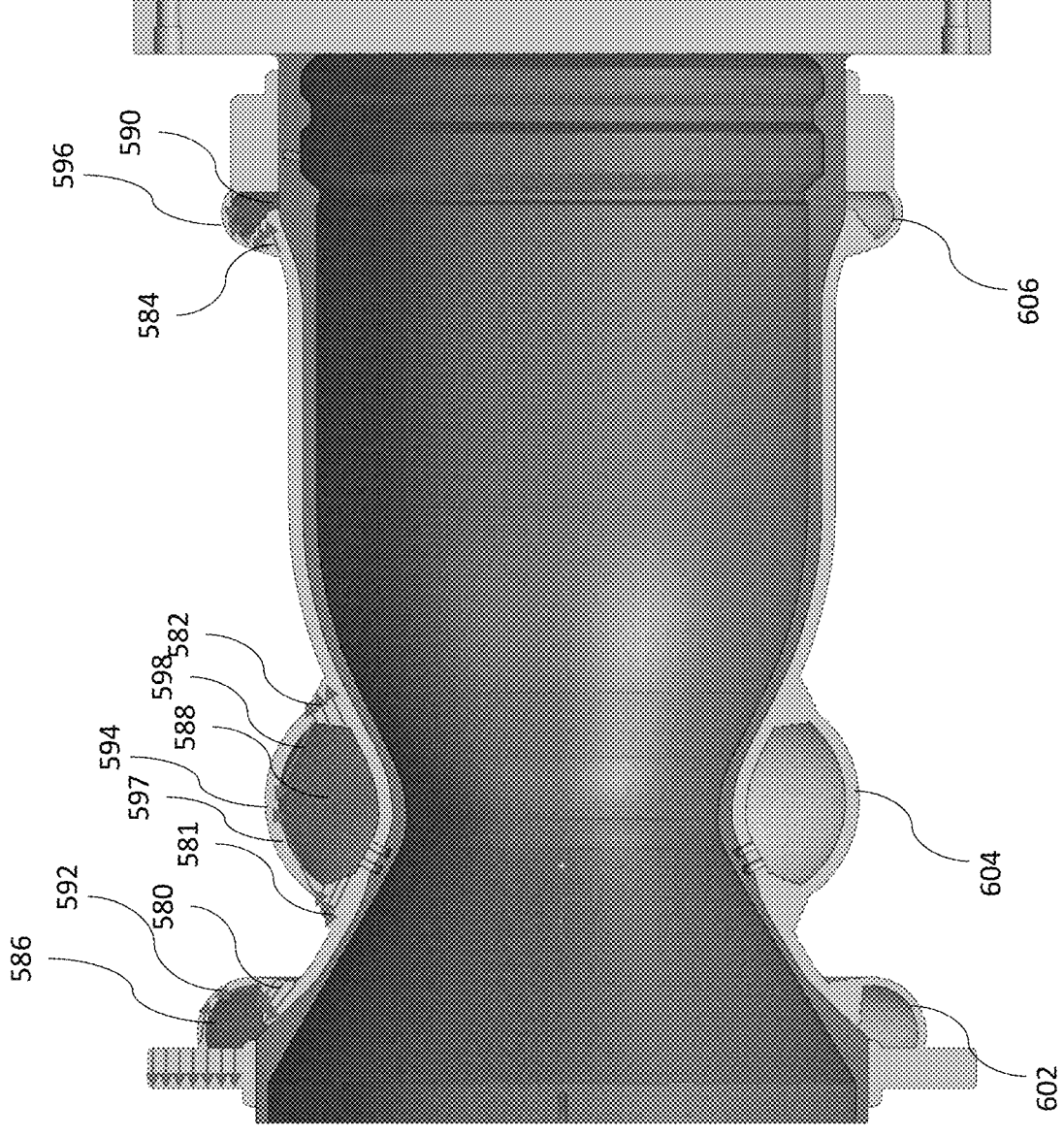
FIG. 20 provides a cross-section of a thrust chamber showing manifold build path in accordance with aspects of the disclosure.

Aspects are also directed to processes for forming integral circumferential fluid manifolds in conjunction with the underlying clad thermal combustion chamber. As shown in FIG. 20, in various embodiments a layer-by-layer additive manufacturing process capable of forming large structures may be used. In aspects of such a process, first circumferential manifold base layers (as shown by arrows) are sequentially deposited in a stepped or tapered configuration to form opposing manifold base structures (580, 581, 582, 584) on either side of a subject outlet/inlet area (586, 588, 590) having general curved contours that are free of sharp edges and angles. Once these base structures are in place enclosing curved upper walls (592, 594, 596) are formed to span and enclose the area bounded by the subject base walls. In various aspects the enclosing curved upper walls are formed in a multi-step process wherein opposing walls (e.g., 597 & 598) are formed atop each of the opposing manifold base structures (as shown by opposing arrows) until the two opposing enclosing walls meet at the apex of the arch defined by the thus formed manifold conduit (602, 604, 606). Once the opposing enclosing walls are thus formed a merging joint is deposited therebetween to join and form the final upper enclosing walls of the manifolds.

While any additive manufacturing methods capable of producing cladding and manifold walls of sufficient thickness (e.g., 0.05 to 0.7") and resolution (e.g., ~1 mm) may be used, according to various aspects one or more of WAAM, PBF or DED are incorporated into the hybrid additive manufacturing process to form the manifolds. Further, as discussed with respect to FIGS. 10*a* to 10*c*, many different structural cladding materials may be used in forming cladding and manifold structures according to aspects. In various aspects, one or more Ni—Cr alloys may be used in conjunction with additive manufacturing processes and in combination with an underlying high temperature conductive material (e.g., Cu-based alloy). For example, in some aspects one or more alloys from the Inconel® or Haynes® families may be used such as for example Haynes-230®, Inconel-625® and/or Inconel-718®.

Figure 21A:
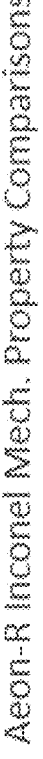
FIG. 21a provides a data plot of mechanical properties of Inconel formed using manufacturing process in accordance with the prior art and aspects of the disclosure.
Figure 21B:
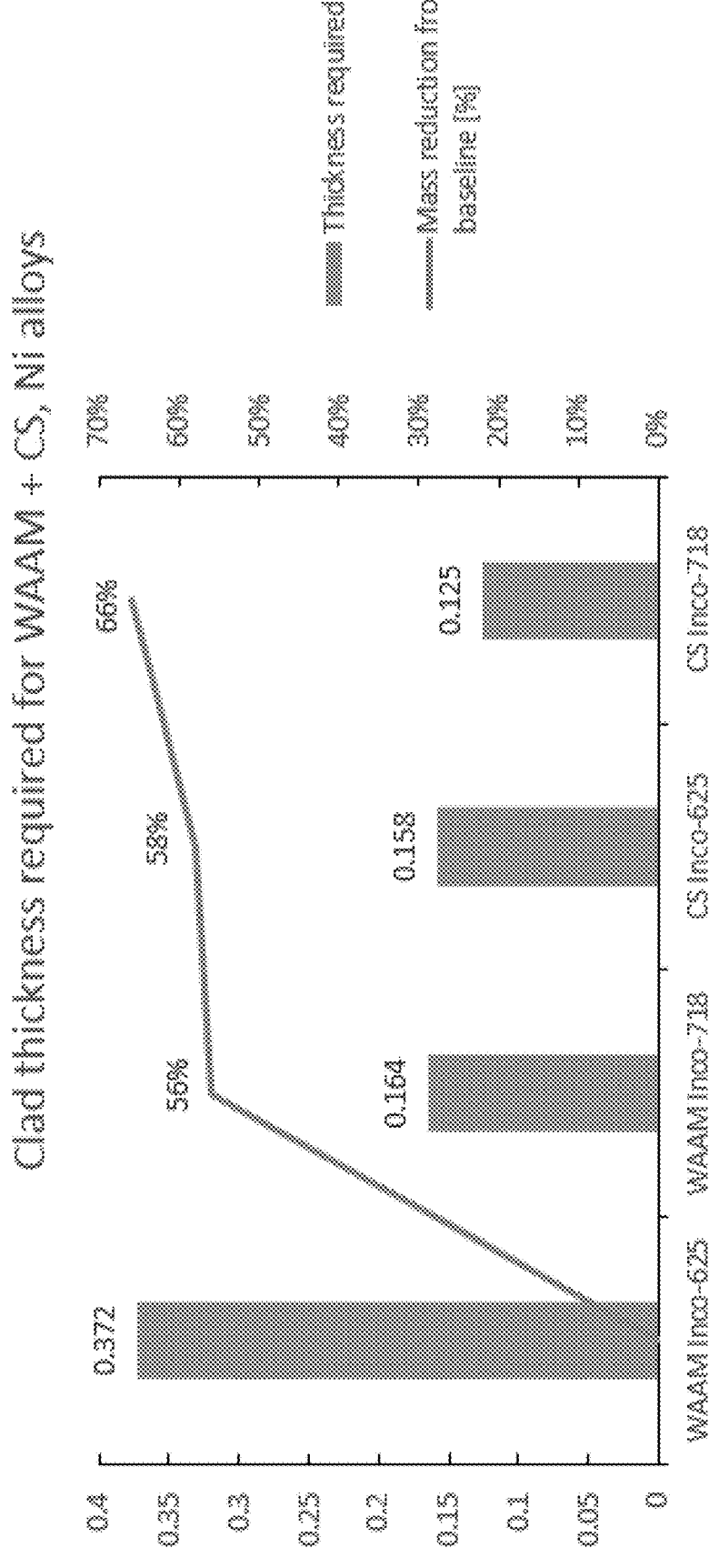
FIG. 21b provides a data plot of cladding thickness in accordance with aspects of the disclosure.

As previously discussed, integral manifolds according to aspects are contemplated to replace conventionally wrought and assembled manifolds. One concern is that such integral manifolds may show inferior mechanical properties, particularly, in a hybrid additive manufacturing process according to aspects of the disclosure in which a PBF liner element formed from a Cu-based alloy may be integrally formed with Ni—Cr cladding layers that are themselves formed using a CS/WAAM/DED process, that are in turn the substrates for fluid manifolds formed thereatop from a similar or different Ni—Cr material using a WAAM/PBF/DED process. However, these aspects of the disclosure have been studied and, as shown in FIGS. 21*a* and 21*b*, the proposed cladding materials show mechanical properties that are superior to or comparable to conventionally wrought materials. Moreover, depending on the materials used (e.g., Inconel-625® vs. Inconel-718®) may provide a substantial savings in required wall thickness. Moreover, tests were performed on welding and joint quality, attainable wall thicknesses and ability to form complex parts and hybrid additive manufacturing techniques according to aspects of the disclosure were able to obtain all orders of merit required to form practical thermal combustion chambers, including exposure to pressure and flow tests of over 5000 psia.

Port and Integration Aspects

As discussed aspects of thermal combustion chambers incorporate an inner structure comprising a regeneratively-cooled liner that defines the internal volume of the thermal combustion chamber including combustion chamber, throat and nozzle, and provides regenerative cooling to the thermal combustion chamber, along with a structural cladding layer and integrated fluid manifolds to interconnect the regeneratively-cooled liner to other elements of the rocket engine and thermal combustion chamber such as the injector assembly. As previously discussed, conventional thermal combustion chambers include other elements, such as component ports and integration features such as brackets and anchor plates for interconnecting other elements, etc. that are formed via conventional assembly means, such as, for example, welding, brazing, bolting, etc. Various aspects of the disclosure are directed to ports and integration features for thermal combustion chambers integrally additively manufactured in conjunction with the fluid manifolds and outer cladding layers. According to aspects, ports and integration features (FIG. 9a, Step E) may be formed integrally onto the outer cladding and manifolds to form a fully integral thermal combustion chamber.

Figures 22A, 22B:
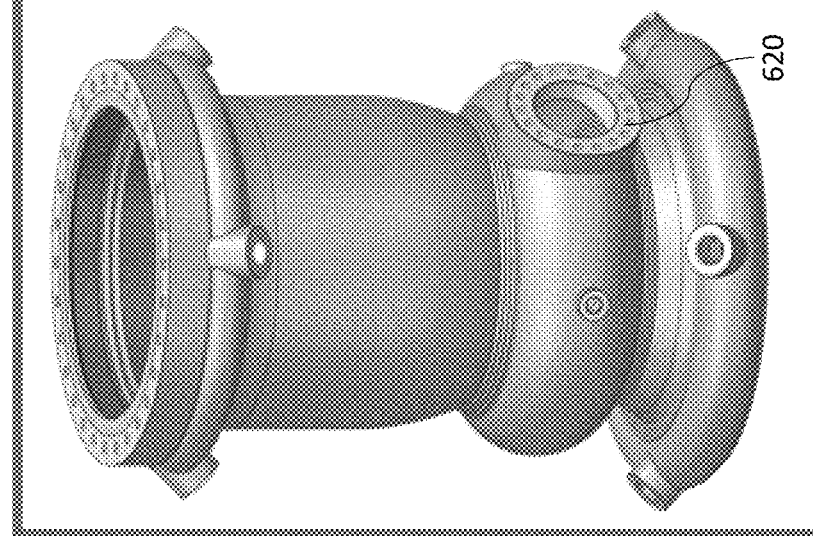
FIG. 22a provides a schematic of a thrust chamber with manifolds and ports in accordance with aspects of the disclosure.
FIG. 22b provides a schematic of a thrust chamber with manifolds, ports and attachment features in accordance with aspects of the disclosure.
Figure 23:
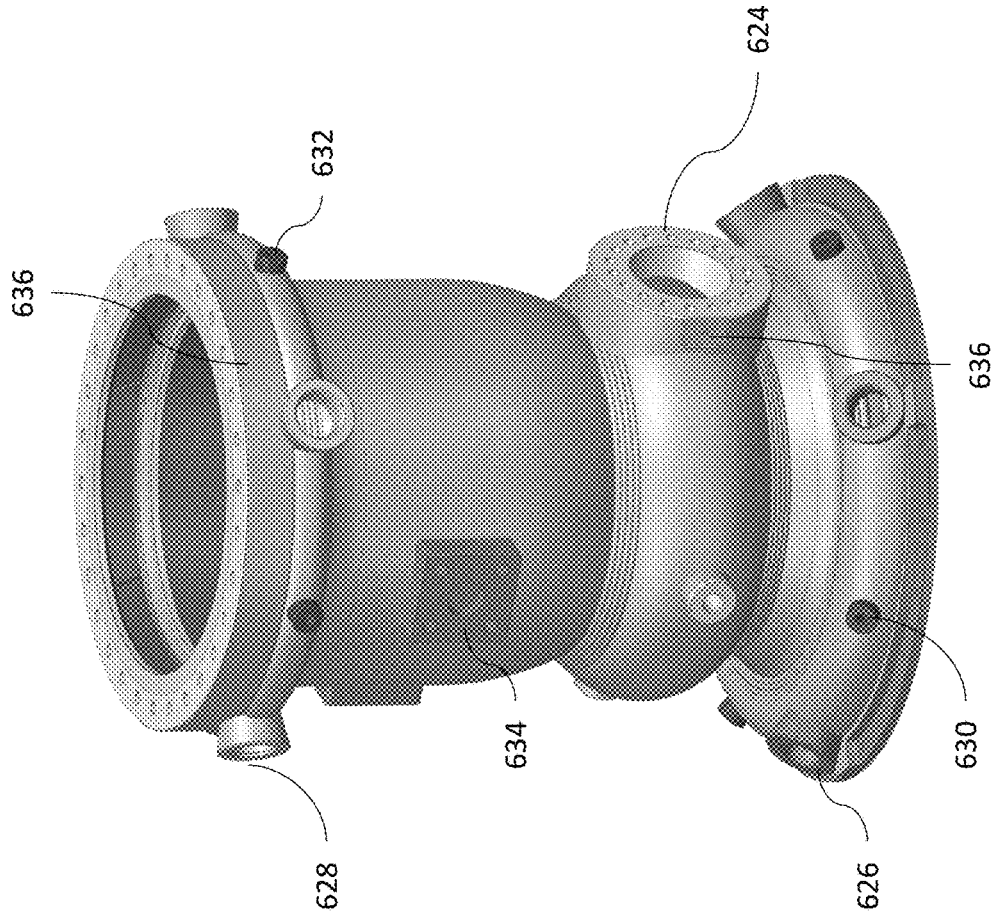
FIG. 23 provides a schematic of a thrust chamber with manifolds, ports and attachment features in accordance with aspects of the disclosure.

Aspects of a thermal combustion chamber incorporating integral ports (620) and integration features (622) are depicted schematically in FIGS. 22a and 22b. As shown, in greater detail in FIG. 23, in many aspects these ports and integration features may come in many forms and configurations depending only on the specific application needs of the thermal combustion chamber. For example, manifold ports may include manifold inlets/outlets (624, 626, 628) and or instrumentation ports (630 & 632). These ports may be set normal to the central axis of the thermal combustion chamber (624 & 628) or angled relative the central axis of the thermal combustion chamber (626), again dependent on the specific configuration needed for any interconnecting conduits. Similarly, the instrumentation ports can be similarly normal (632) or angled (630) relative the central axis of the thermal combustion chamber. Integration features can be likewise located anywhere on the thermal combustion chamber body depending on the nature of the element of the overall rocket engine to be attached thereto. For example, in some aspects integration features are formed onto the cladding layer (634), while in other aspects integration features may be formed on the manifolds or ports (636).

Regardless of the specific arrangement and configurations of the ports and integration features they may either be conventionally attached via brazing or welding, or they may be incorporated into hybrid additive manufacturing processes as previously described. Specifically, holes for ports are formed into the outer wall of the previously printed manifolds by a suitable process, such as, for example, EDM or other drilling or cutting technique, and then the bodies of ports are additively manufactured using a suitable technique to form integral ports. The final fluid passage to the underlying manifold for each port is then machined out to form the necessary flange faces and interconnections. Integration features may be directly additively manufactured onto the appropriate portion of the outer cladding, port or manifold of the thermal combustion chamber and then the necessary integration features (e.g., mating faces and interconnections) machined as necessary.

While any additive manufacturing methods capable of producing integral integration features and ports of sufficient dimension and resolution may be used, according to various aspects one or more of WAAM, PBF or DED are incorporated into the hybrid additive manufacturing process to form the integral ports and integration features. Further, as discussed with respect to FIGS. 10a to 10c, many different structural cladding materials may be used in forming ports and integration features according to aspects. In various aspects, one or more Ni—Cr alloys may be used in conjunction with additive manufacturing processes and in combination with the underlying cladding material. For example, in some aspects one or more alloys from the Inconel® or Haynes® families may be used such as for example Haynes-230®, Inconel-625® and/or Inconel-718®.

Lower Thrust Skirt Aspects

Figures 24A, 24B:
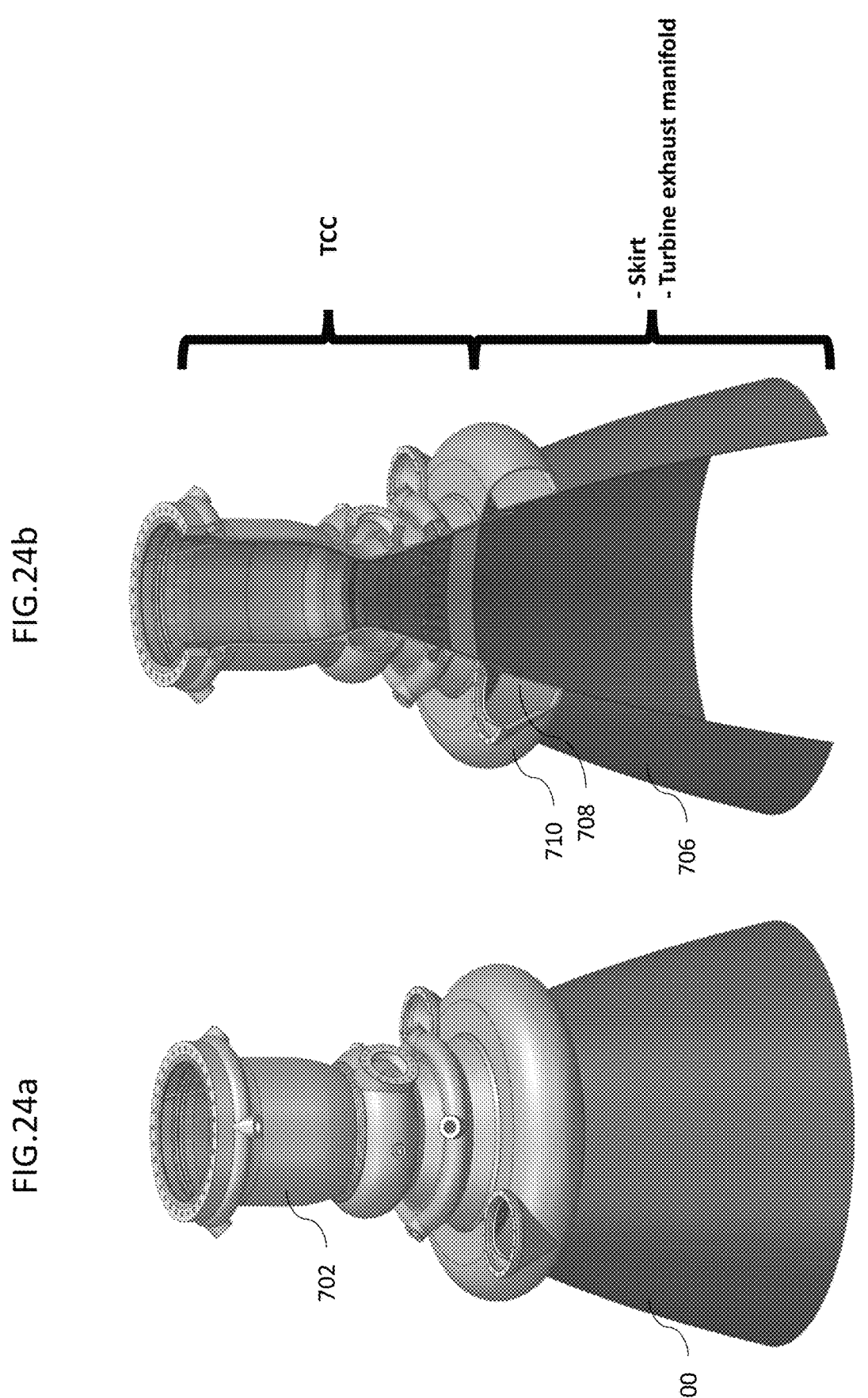
FIG. 24a provides a schematic of a thrust chamber with a lower skirt in accordance with aspects of the disclosure.
FIG. 24b provides a cross-section of a thrust chamber with a lower skirt in accordance with aspects of the disclosure.

Although the above discussion has focused on aspects of a fully integral thermal combustion chamber and hybrid additive techniques for forming such a device, it will be understood that the thermal combustion chamber is only a portion of the overall rocket engine. While conventionally the thermal combustion chamber is formed separately from other components of such engines, hybrid additive manufacturing processes according to aspects of the disclosure allow for the integration of many functional elements into the overall thermal combustion chamber, including as previously discussed, regeneratively-cooled liner elements, cladding layers, fluid manifolds, instrument and fluid ports and integration brackets and interconnections. According to various aspects, as shown in FIGS. 24a and 24b, such integration may extend to the lower thrust skirt also.

In such embodiments, the skirt (700) may be formed separately from the thermal combustion chamber (702) and attached to it via bolts, welding, or other conventional means, or may be additively manufactured directed together with the thermal combustion chamber. Aspects of a process for forming the lower skirt may take many of the same steps described above with respect to the thermal combustion chamber. Specifically, a first additive manufacturing process such as PBF, WAAM or DED may be used to form the skirt body (706) and then cladding layers (708) and fluid manifolds (710) may be integrally formed atop the skirt body as necessary using one or more compatible additive manufacturing technique, such as, for example, CS, WAAM, DED, etc. Similar materials constraints and considerations may also be used in forming the skirt and skirt manifolds as described above with relation to the thermal combustion chamber and related figures.

Figures 26A, 26B:
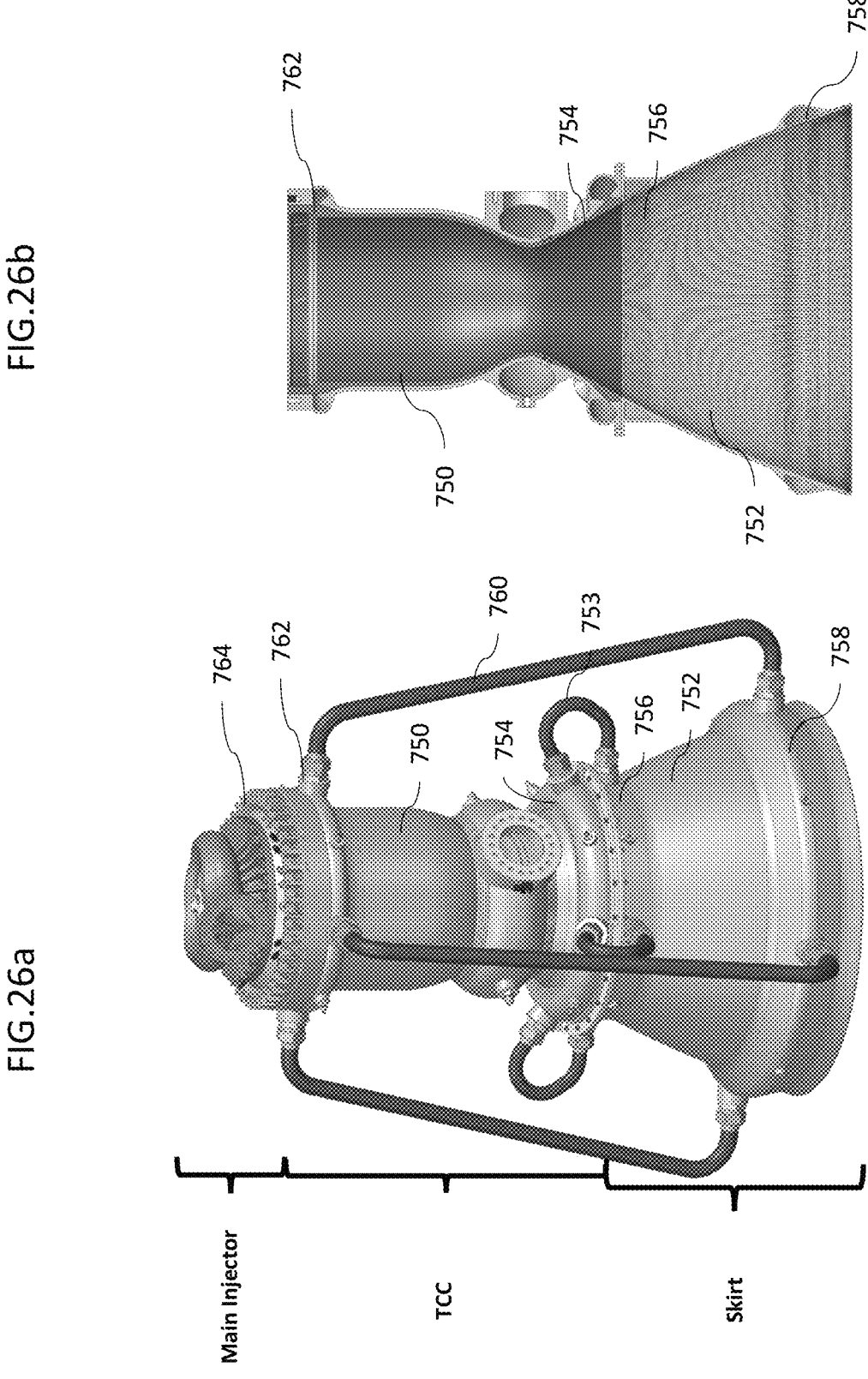
FIG. 26a provides a schematic of a thrust chamber with regenerative fuel manifolds and conduits in accordance with aspects of the disclosure.
FIG. 26b provides a cross-section of a thrust chamber with regenerative fuel manifolds and conduits in accordance with aspects of the disclosure.

Moreover, as shown in FIGS. 25a and 25b, the regenerative cooling circuit used for the thermal combustion chamber may be extended to the skirt. This regenerative cooling may take any of the forms previously discussed in relation to the thermal combustion chamber. For example, in various aspects film cooling (FIG. 25a) may be adopted. In such aspects, an outlet (710) from the aft manifold (712) of the thermal combustion chamber (714) is configured to inject a film of fluid (716) onto the inner wall of the lower skirt thereby providing cooling. Alternatively, as shown in FIG. 25b, in some aspects the walls of the lower skirt are provided with internal cooling channels (not shown) that are interconnected through the aft manifold (718) of the thermal combustion chamber (720) with the regenerative cooling path from the thermal combustion chamber such that flow (722) of the cooling fluid is extended and recycled through the lower skirt and back into the thermal combustion chamber. A more detailed view of how such an extended regenerative cooling system may be configured is provided in FIGS. 26a and 26b. As shown, in various aspects the inner cooling channels of the thermal combustion chamber (750) and lower skirt (752) are interconnected via fluid conduits (753) interconnected at pair of jumper manifolds (754 & 756) disposed at the aft end of the thermal combustion chamber (754) and the fore end of the lower skirt (756). The fluid flow then passes through the skirt until it reaches the aft return manifold (758) at the aft end of the lower skirt. The fluid is then returned through fluid conduits (760) to the forward return manifold (762) and thus into the injection assembly (764).

Regardless of the design, the process for integrally forming the lower skirt follows the same considerations and process steps as those described with respect to the thermal combustion chamber (for example, with respect to FIG. 9a) albeit modified as necessary to meet the physical and mechanical requirements of the lower skirt. Similarly, all the materials, material compatibility and constraints are applicable with respect to the formation of the integral lower thrust skirt.

Although specific embodiments of the invention have been described and illustrated, the invention is not to be limited to the specific forms or arrangements of parts so described and illustrated. The scope of the invention is to be defined by the claims appended hereto and their equivalents.

Although the operations of the method(s) herein are shown and described in a particular order, the order of the operations of each method may be altered so that certain operations may be performed in an inverse order or so that certain operations may be performed, at least in part, concurrently with other operations. Instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

What is claimed is:

1. A hybrid additive manufacturing method for forming a thermal combustion chamber comprising:

powder bed fusion forming an integral regeneratively-cooled liner body of a first material, having an inner wall defining an open-ended combustion chamber volume, an outer wall having at least one set of inlets and at least one set of outlets disposed at different heights along a length thereof, and a plurality of cooling channels formed between the inner and outer walls and in fluid communication with the at least one set of inlets and at least one set of outlets;

wire arc additive manufacturing, directed energy deposition, or cold spray additive manufacturing forming at least one structural cladding region of a second material, integral with and extending around a perimeter of the liner body over at least a portion of the outer wall adjacent to or overlapping the at least one set of inlets and at least one set of outlets;

wire arc additive manufacturing or directed energy deposition forming at least one separate fluid manifold formed of a third material and disposed in association with and in fluid communication with each of the at least one set of inlets and the at least one set of outlets, each of the separate fluid manifolds being integral with the at least one structural cladding region and comprising:

first and second base structures, wherein each of the first and second base structures comprises a plurality of tapered stepped layers such that each of the first and second base structures narrow from a first end proximal to the structural cladding to a second end distal to the structural cladding, wherein the first and second base structures are integral with the at least one structural cladding region and extend around the perimeter of the liner body on opposing sides of the at least one set of inlets or at least one set of outlets, and an upper wall integral with the second ends of and spanning between the first and second base structures such that the first and second base structures and the upper wall form a fluid manifold enclosure extending around the perimeter of the liner body over the associated at least one set of inlets and at least one set of outlets, wherein the fluid manifold enclosure of each fluid manifold defines a fluid manifold outer wall and inner fluid conduit and are configured such that the inner fluid conduit has a generally cylindrical fluid manifold cross-section;

wire arc additive manufacturing or directed energy deposition forming at least one fluid access port integrally disposed in each of the fluid manifold outer walls and having connection elements disposed thereon such that each of the at least one fluid access port allows for external fluid communication to one of the fluid manifolds; and wherein the at least one separate fluid manifold, at least one fluid access port, at least one set of inlets, at least one set of outlets, and cooling channels of the liner body define a single fluid flow path therebetween having a termination at an upper end of the thermal combustion chamber.

2. The method of claim 1, wherein the cooling channels have a dimensional resolution of less than 0.05 mm.

3. The method of claim 1, wherein, of the first material, the second material and the third material, at least two are distinct.

4. The method of claim 3, wherein at least one of the at least two distinct materials comprises a Cu-based alloy or a Ni—Cr-based alloy.

5. The method of claim 1, further comprising forming at least one feature integrally formed or interconnected on or within the structure of the liner body, the structural cladding and/or the fluid manifold.

6. The method of claim 5, wherein the forming the at least one feature is performed using wire arc additive manufacturing or directed energy deposition.

7. The method of claim 5, wherein the at least one feature comprises a flange, a separate fluid manifold, a fuel injection manifold, or a thrust skirt.

8. The method of claim 7, wherein the at least one feature comprises the thrust skirt, and the method further comprises powder bed fusion, wire arc additive manufacturing, or directed energy deposition forming the thrust skirt integral with or interconnected with a second open end of the thermal combustion chamber volume and defining a generally open conical inner volume wherein a circumference of the conical inner volume expands distal to the thermal combustion chamber.

9. The method of claim 8, wherein the thrust skirt further comprises inner and outer walls, and a plurality of cooling channels formed therebetween, the plurality of cooling channels in fluid communication with the cooling channels of the regeneratively-cooled liner body.

10. The method of claim 9, wherein the thrust skirt further comprises:

a set of fluid inlets disposed in an outer surface thereof at a first end thereof proximal to the thermal combustion chamber;

a set of fluid outlets disposed in an outer surface thereof at a second end thereof distal to the thermal combustion chamber, wherein the set of fluid inlets and outlets are in fluid communication with the plurality of cooling channels disposed within the thrust skirt, wherein separate integral fluid manifolds are formed on the outer surface and around the perimeter of the thrust skirt to enclose each of the set of fluid inlets and outlets, and are in fluid communication with separate fluid manifolds on the thrust combustion chamber, and wherein the separate integral fluid manifolds are formed using wire arc additive manufacturing or directed energy deposition.

11. The method of claim 10, further comprising wire arc additive manufacturing or directed energy deposition forming at least one integration feature integrally on at least one element selected from the group consisting of: the structural cladding region, the at least one fluid manifold, and the at least one fluid access port.

* * * * *